(12) United States Patent
Ushijima

(10) Patent No.: US 10,140,722 B2
(45) Date of Patent: Nov. 27, 2018

(54) DISTANCE MEASUREMENT APPARATUS, DISTANCE MEASUREMENT METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/429,614

(22) Filed: Feb. 10, 2017

(65) Prior Publication Data
US 2017/0287152 A1 Oct. 5, 2017

(30) Foreign Application Priority Data
Mar. 30, 2016 (JP) ................. 2016-068559

(51) Int. Cl.
| | |
|---|---|
| G06K 9/00 | (2006.01) |
| G06T 7/521 | (2017.01) |
| G06T 7/136 | (2017.01) |
| G06T 7/90 | (2017.01) |
| G06T 5/00 | (2006.01) |
| G01S 17/10 | (2006.01) |
| G01S 17/42 | (2006.01) |
| G01S 17/89 | (2006.01) |
| G01S 7/487 | (2006.01) |

(52) U.S. Cl.
CPC ............ *G06T 7/521* (2017.01); *G01S 7/4876* (2013.01); *G01S 17/10* (2013.01); *G01S 17/42* (2013.01); *G01S 17/89* (2013.01); *G06T 5/002* (2013.01); *G06T 7/136* (2017.01); *G06T 7/90* (2017.01); *G06T 2207/10024* (2013.01); *G06T 2207/10028* (2013.01)

(58) Field of Classification Search
CPC . G06T 2207/10024; G06T 2207/10028; G06T 5/002; G06T 7/136; G06T 7/521; G06T 7/90; G01S 17/10; G01S 17/42; G01S 17/89; G01S 7/4876
See application file for complete search history.

(56) References Cited

U.S. PATENT DOCUMENTS

| | | | |
|---|---|---|---|
| 2006/0088213 A1* | 4/2006 | Enomoto | G06T 7/11 |
| | | | 382/173 |
| 2007/0206182 A1 | 9/2007 | Ishikawa et al. | |

(Continued)

FOREIGN PATENT DOCUMENTS

| | | |
|---|---|---|
| JP | 2005-24370 | 1/2005 |
| JP | 2005-291844 | 10/2005 |
| JP | 2013-224915 | 10/2013 |

*Primary Examiner* — Tom Y Lu
(74) *Attorney, Agent, or Firm* — Staas & Halsey LLP

(57) ABSTRACT

An apparatus generates an image having a plurality of pixels, each of the plurality of pixels corresponding to a range point and representing a distance value, extracts from the image a first area having a plurality of range points at which the distance value is less than or equal to a first threshold wherein a difference between each pair of the plurality of range points included in the first area is less than or equal to a second threshold, and determines the first area as a noise area when the first area meets a certain condition.

19 Claims, 30 Drawing Sheets
(11 of 30 Drawing Sheet(s) Filed in Color)

(56) References Cited

U.S. PATENT DOCUMENTS

| | | | | |
|---|---|---|---|---|
| 2007/0257910 | A1* | 11/2007 | Gutmann | B62D 57/024 |
| | | | | 345/424 |
| 2010/0172567 | A1* | 7/2010 | Prokoski | A61B 5/0064 |
| | | | | 382/132 |
| 2012/0263353 | A1* | 10/2012 | Kitajima | G01S 7/4802 |
| | | | | 382/106 |
| 2015/0138334 | A1* | 5/2015 | Usuba | G02B 21/365 |
| | | | | 348/79 |
| 2015/0161771 | A1* | 6/2015 | Hiasa | G06K 9/6201 |
| | | | | 382/195 |
| 2016/0014406 | A1* | 1/2016 | Takahashi | G06T 7/73 |
| | | | | 348/148 |
| 2016/0370459 | A1* | 12/2016 | Shiraishi | G06K 9/00201 |

* cited by examiner

US 10,140,722 B2

DISTANCE MEASUREMENT APPARATUS, DISTANCE MEASUREMENT METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-068559, filed on Mar. 30, 2016, the entire contents of which are incorporated herein by reference.

FIELD

The embodiments discussed herein are related to a distance measurement apparatus, a distance measurement method, and a non-transitory computer-readable storage medium.

BACKGROUND

A distance measurement apparatus using laser beams measures a distance to an object, for example, by emitting a pulsed laser beam and measuring the time of flight (TOF) $\Delta T$, which is a round-trip time for the laser beam to return after being reflected by the object. Here, denoting the speed of light as c (about 300,000 km/s), the distance to an object may be obtained by $(c \times \Delta T)/2$.

In some cases, the measurement result of the distance measurement apparatus is output in the form of an image in which the distance to each range point is represented. An image output in such a form is capable of representing a distance to each range point, for example, by pixel color in accordance with the distance value. However, an area in which the distance is not correctly measured (a noise area) results from the influence of sunlight in some cases in an image in which the distance to each range point is represented.

As examples of the related art, Japanese Laid-open Patent Publication No. 2005-024370, Japanese Laid-open Patent Publication No. 2013-224915, and Japanese Laid-open Patent Publication No. 2005-291844 are known.

SUMMARY

According to an aspect of the invention, an apparatus for distance measurement includes: a memory; and a processor coupled to the memory and configured to execute a measurement process that includes generating an image having a plurality of pixels, each of the plurality of pixels corresponding to a range point and representing a distance value obtained by measuring a distance to the range point based on reflected light of a pulsed laser beam for two-dimensional scanning, execute a first process that includes extracting, from the image, a first area having a plurality of range points at which the distance value is less than or equal to a first threshold, wherein a difference between each pair of the plurality of range points included in the first area is less than or equal to a second threshold, and the first area has an area size less than or equal to a threshold size, and execute a second process that includes extracting an area group which has a plurality of the first areas, wherein a distance, in terms of two-dimensional coordinates in the image, between each of the plurality of the first areas and another of the plurality of the first areas is less than or equal to a third threshold, and a difference of the distance value between each pair of the plurality of the first areas is greater than a fourth threshold, and determining the area group as a noise area when the number of the plurality of the first areas included in the area group is greater than or equal to a certain number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

With an existing distance measurement apparatus, when a measurement result is output in the form of an image in which the distance to each range point is represented, it is difficult to detect noise resulting from the influence of sunlight in the image.

As one aspect of the present embodiment, provided are solutions for being able to perform: detecting noise resulting from the influence of sunlight in an image in which the distance to each range point is represented.

With a distance measurement apparatus, a distance measurement method, and a program disclosed herein, the distance to an object is measured based on the reflected light of a pulsed laser beam with which two-dimensional scanning is performed. A first area having an area size less than or equal to a threshold size is extracted among areas of range points. Each of the range points has a distance value on an image, the distance value representing a distance to the range point, the distance value being less than or equal to a first threshold. The range points have a difference between the distance values, the difference being less than or equal to a second threshold. In addition, there are a plurality of area groups each being formed of the first areas, each of which has a distance in terms of two-dimensional coordinates in the image, the distance being less than or equal to a third threshold, and which have a difference between the distance values being greater than a fourth threshold. Among the area groups, an area group where the number of the first areas forming the area group is greater than or equal to a certain number is determined as a noise area.

Hereinafter, each embodiment of a distance measurement apparatus, a distance measurement method, and a program disclosed herein will be described in conjunction with the accompanying drawings.

Figure 1:
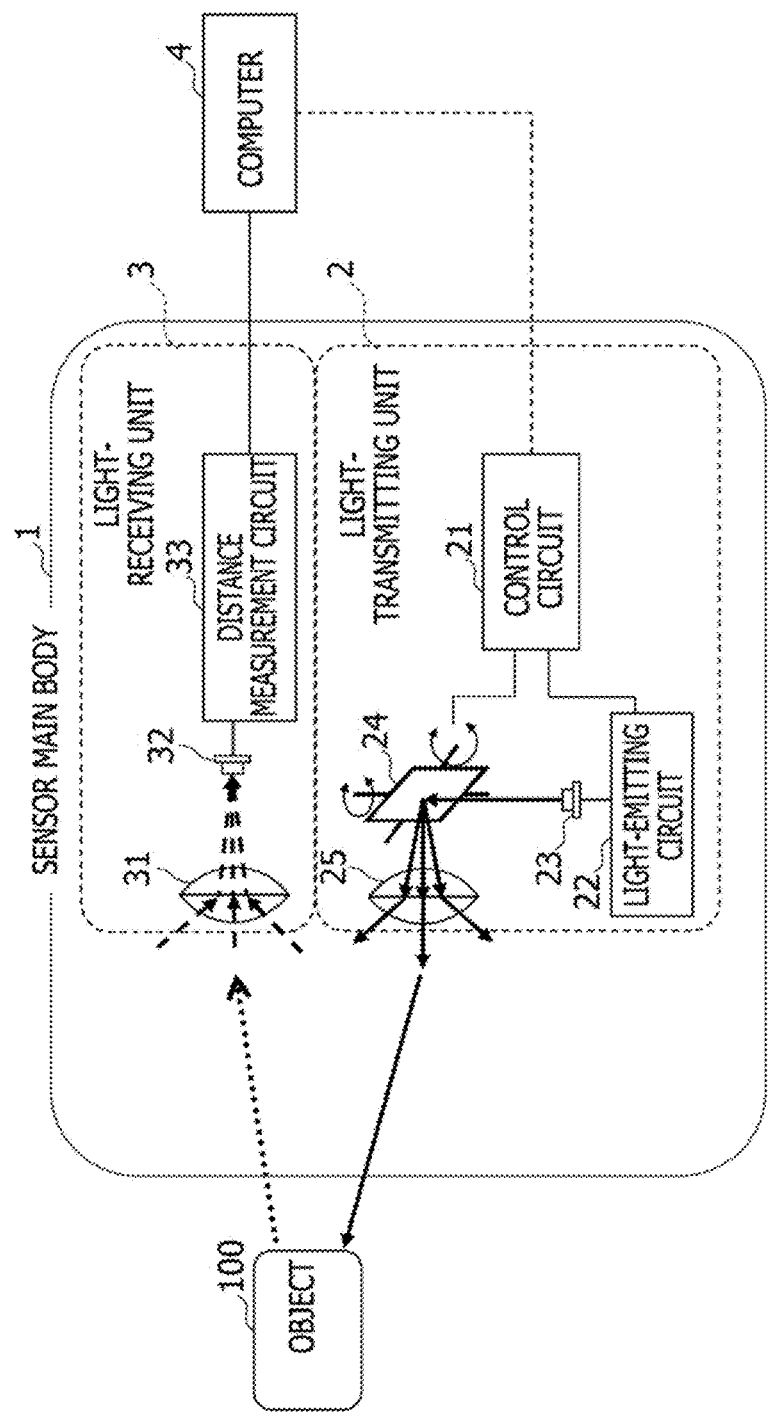
FIG. 1 is a diagram illustrating an example of a distance measurement apparatus in one embodiment.

FIG. 1 is a diagram illustrating an example of a distance measurement apparatus in one embodiment. The distance measurement apparatus illustrated in FIG. 1 includes a sensor main body 1 including a light-transmitting unit 2 and a light-receiving unit 3, and a computer 4.

The light-transmitting unit 2 includes, for example, a control circuit 21, a light-emitting circuit 22, a laser beam source 23, a two-dimensional micro electro mechanical system (MEMS) mirror 34, and a scanning angle magnifying lens 25. The control circuit 21 controls the light-emitting circuit 22 so that the laser beam source 23 emits a pulsed laser beam under the control of the light-emitting circuit 22. The control circuit 21 also controls a drive unit (not illustrated) that drives the two-dimensional MEMS mirror 34 in two dimensions so that a laser beam emitted from the laser beam source 23 performs scanning in two dimensions (for example, in the horizontal and vertical directions relative to the ground). Thus, the laser beam, passing through the scanning angle magnifying lens 25, performs two-dimensional scanning as indicated by the solid line in FIG. 1. The laser beam reflected by the object 100 is received by the light-receiving unit 3 as indicated by the dotted line in FIG. 1. The laser beam source 23 has a known configuration for emitting, for example, an infrared or near-infrared laser beam.

The light-receiving unit 3 includes, for example, a light-receiving lens 31, an optical detector 32, and a distance measurement circuit 33. A laser beam reflected by the object 100 passes through the light-receiving lens 31 and is detected by the optical detector 32. The detected output of the optical detector 32 is supplied to the distance measurement circuit 33. The distance measurement circuit 33 measures the time of flight (TOF) ΔT taken from the instance a laser beam is emitted until the instance the laser beam returns from the object 100 after being reflected by the object 100, and thus optically measures the distance to the object 100 and outputs a signal indicating the measured distance. Here, denoting the speed of light as c (about 300,000 km/s), the distance to the object may be obtained by (c×ΔT)/2.

The signal indicating the distance to each range point measured by the distance measurement circuit 33 is output from the light-receiving unit 3 to the computer 4. The range point is a point on an object at which a laser beam emitted from the sensor main body 1 is to arrive and the distance to which is to be measured. The range points in this example include points on the object 100 and points on the background within the scanning range of a laser beam. In addition, the distance to a range point is a distance from the sensor main body 1 to the range point. The computer 4 generates an image in which the distance to each range point is represented, based on a signal indicating the distance to the range point. In this example, the computer 4 generates an image in which each range point is represented by pixel color in accordance with the distance value, based on the signal indicating the distance to the range point. Note that the computer 4 may set the light emission timing, the light emission power, and the like of the laser beam source 23 controlled by the control circuit 21 of the light-transmitting unit 2, as illustrated by the broken like in FIG. 1.

Figure 2:
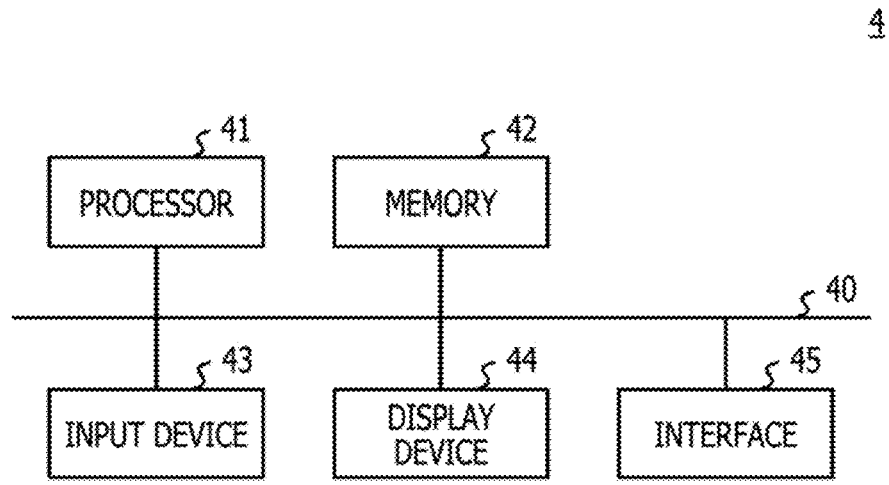
FIG. 2 is a block diagram illustrating an example of a computer.

The computer 4 may have, for example, a configuration as illustrated in FIG. 2. FIG. 2 is a block diagram illustrating an example of a computer. The computer 4 illustrated in FIG. 2 includes a processor 41, memory 42, an input device 43, a display device 44, and an interface (or a communication device) 45 coupled to one another via a bus 40. The processor 41 is capable of being formed, for example, of a central processing unit (CPU) or the like, and executes a program stored in the memory 42 to manage the control over the entire computer 4. In other words, by executing a program stored in the memory 42, the processor 41 is appropriately converted to hardware circuitry for executing processing according to each embodiment disclosed below. The memory 42 is capable of being formed of a computer-readable storage medium such as, for example, a semiconductor storage device, a magnetic recording medium, an optical recording medium, or a magneto-optical recording medium. The memory 42 stores various programs, including a distance measurement program, to be executed by the processor 41, various types of data, and the like.

The input device 43 is capable of being formed, for example, of a keyboard or the like operated by the user (or the operator), and is used for input of commands and data to the processor 41. The display device 44 displays a message for the user, an image of a measurement result in a distance measurement process, and so on. The interface 45 communicatively couples the computer 4 to another computer or the like. In this example, the computer 4 is coupled via the interface 45 to the distance measurement circuit 33 of the light-receiving unit 3. The computer 4 may be coupled via the interface 45 to the control circuit 21 of the light-transmitting unit 2.

Note that the computer 4 is not limited to having a hardware configuration in which the elements of the computer 4 are coupled via the bus 40. A general purpose computer, for example, may be used as the computer 4.

In addition, the input device 43 and the display device 44 of the computer 4 may be omitted. In addition, for a module, a semiconductor chip, or the like in which the interface 45 of the computer 4 is further omitted, the output of the sensor main body 1 (that is, the output of the distance measurement circuit 33) may either be coupled to the buts 40 or directly coupled to the processor 41.

First Embodiment

Figure 3:
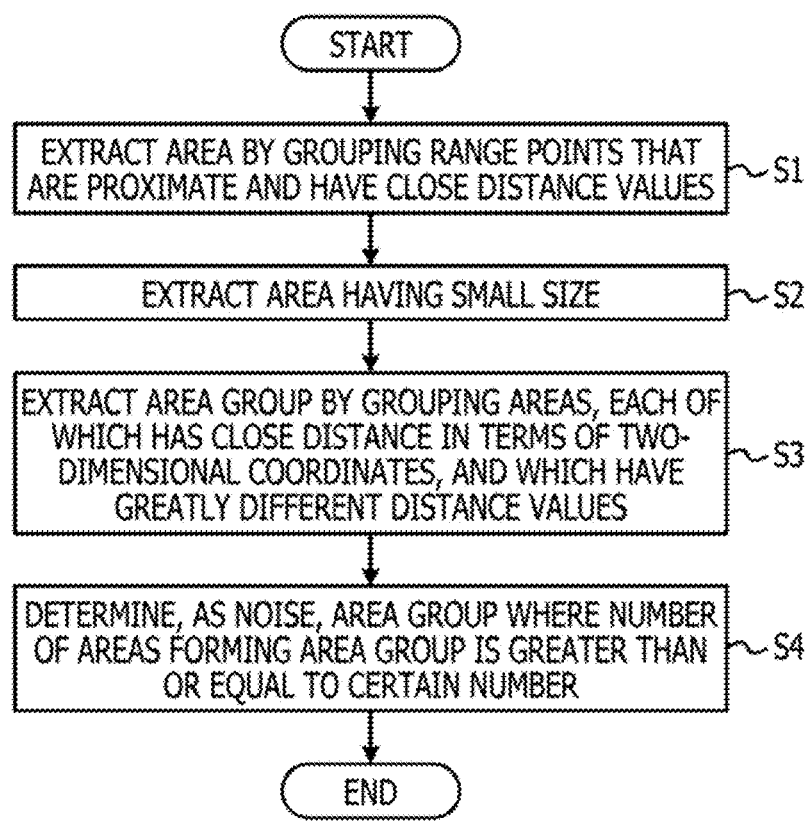
FIG. 3 is a flowchart illustrating an example of a distance measurement process in a first embodiment.
Figure 4:
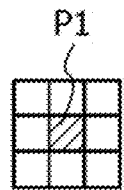
FIG. 4 is a diagram illustrating proximate range points having close distance values.

FIG. 3 is a flowchart illustrating an example of a distance measurement process in a first embodiment. The distance measurement process illustrated in FIG. 3 is executed, for example, by the processor 41 illustrated in FIG. 2 executing a distance measurement program stored in the memory 42. In FIG. 3, in step S1, the processor 41 extracts areas each formed by grouping range points, the range points being proximate and having close distance values in an image in which the distance to each range point is represented by pixel color in accordance with the distance value. In particular, the processor 41 extracts an area by grouping range points, each of which has a distance value on the image, the distance value being less than or equal to a threshold (for example, a first threshold), with the difference between the distance values of the range points less than or equal to a threshold (for example, a second threshold). One range point in terms of two-dimensional coordinates in the image in which the distance to each range point is represented by pixel color in accordance with the distance value may correspond to, for example, one pixel in the image or correspond to a plurality of pixels. Whether one range point in terms of two-dimensional coordinates in the image corresponds to one pixel of the image or corresponds to a plurality of pixels may be selected in accordance with, for example, the pulse duration of a laser beam, the resolution desired for the image, or the like. FIG. 4 is a diagram illustrating proximate range points having close distance values. In the example illustrated in FIG. 4, there are, for example, eight range points that are proximate to a range point P1 indicated by hatching. The proximate range points are range points adjacent to each other in the example illustrated in FIG. 4. In addition, the range points having close distance values refer to range points between which the difference in distance value is less than or equal to a threshold.

Figure 5:
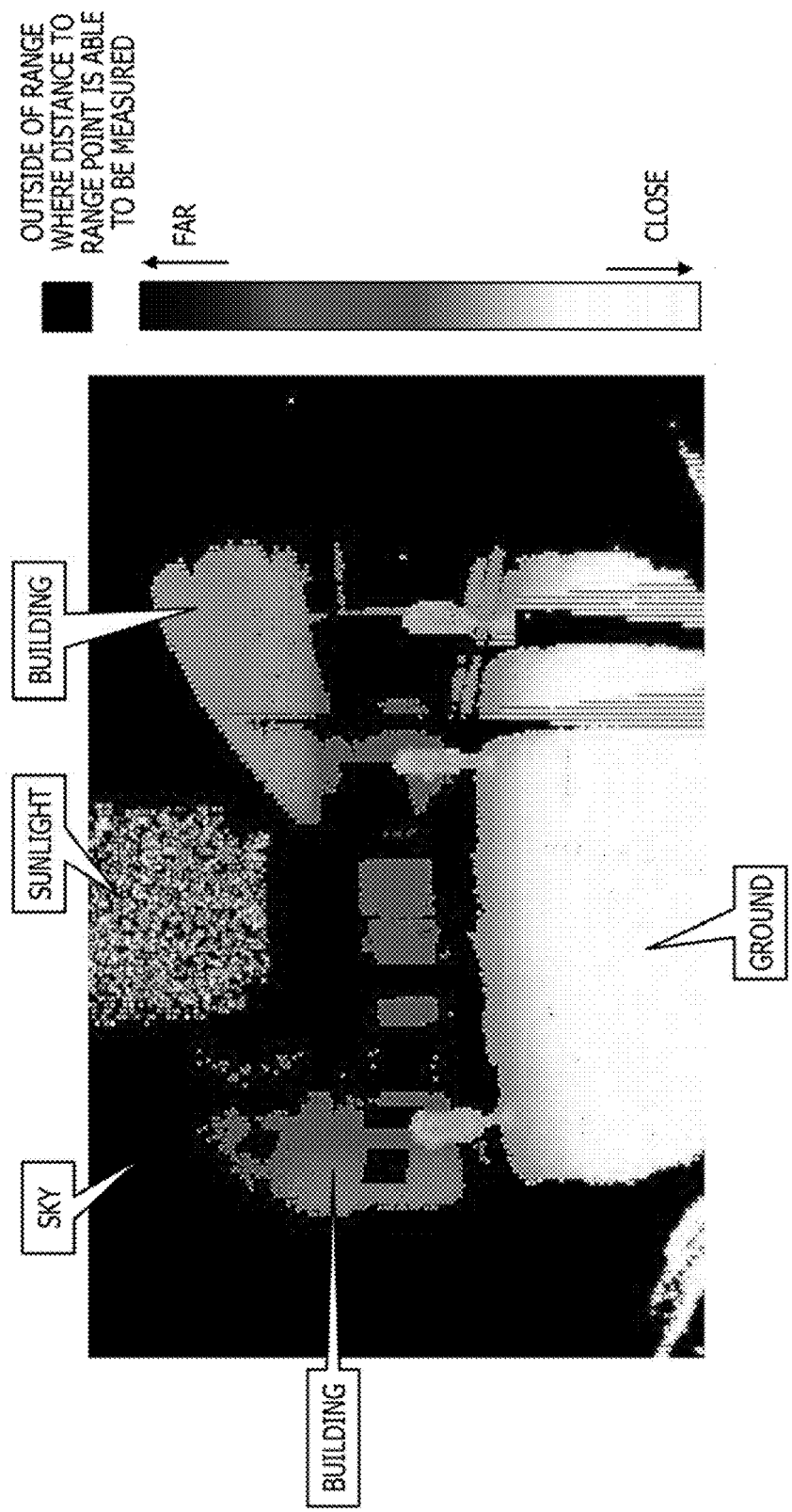
FIG. 5 is a diagram illustrating an example of an input image.
Figure 6:
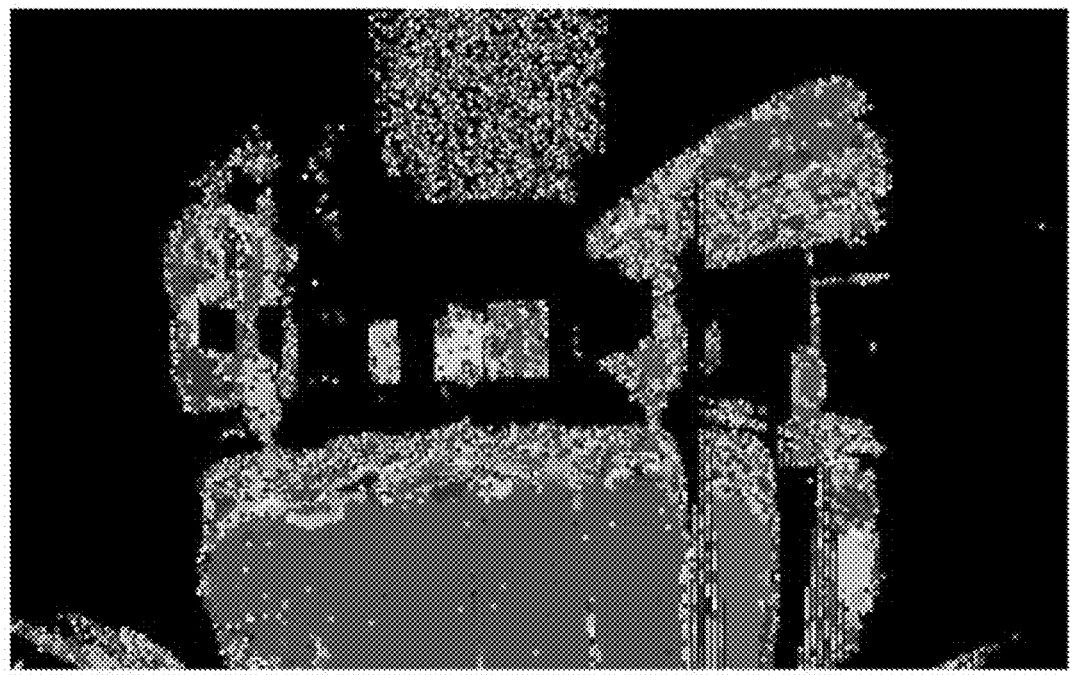
FIG. 6 is a diagram illustrating an example of a processing result of step S1.

FIG. 5 is a diagram illustrating an example of an input image. In the example illustrated in FIG. 5, the input image includes distance data of the ground, a building, the sky, and sunlight from in front of the plane of the figure. In addition, FIG. 6 is a diagram illustrating an example of a processing result of step S1. In this example, the input image illustrated in FIG. 5 is output from the distance measurement circuit 33 of the light-receiving unit 3 in the sensor main body 1, and is input to the computer 4. In this input image, the distance to each range point is represented by pixel color in accordance with the distance value. In FIG. 5, for convenience, the whiter the color, the closer the distance, and the darker the halftones, the farther the distance. Black indicates a range point lying outside the range where the distance to the range point is able to be measured. FIG. 6 illustrates a processing result of step S1 for this input image. However, varying halftone density levels illustrated in FIG. 6 are given simply for identifying different areas, not for indicating the distance value of each range point.

Figure 7:
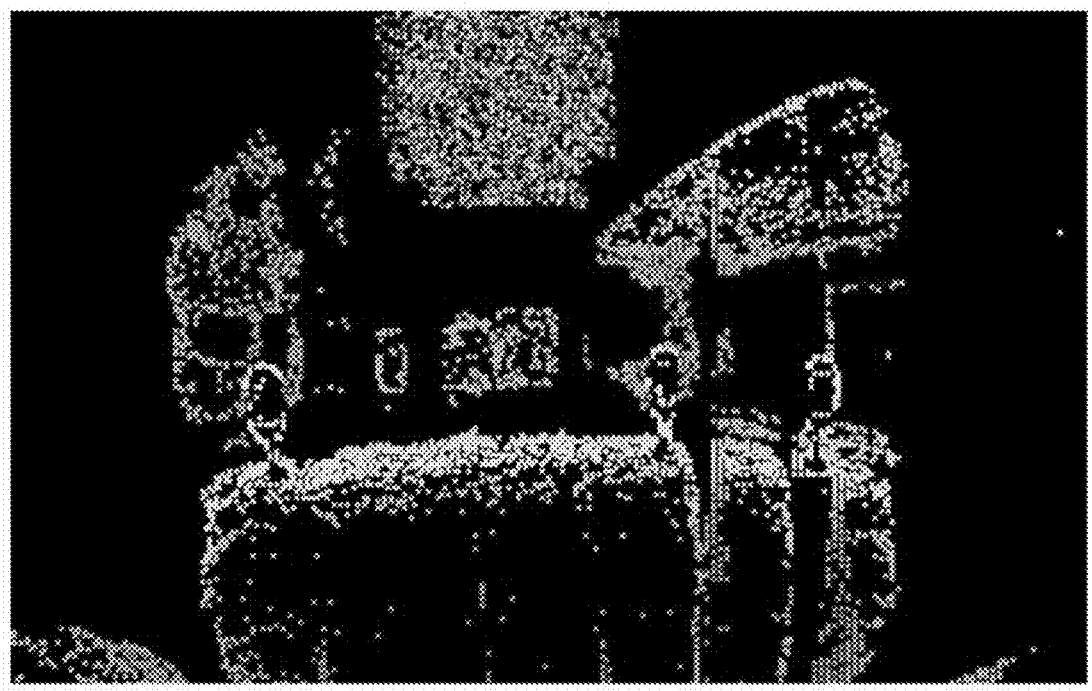
FIG. 7 is a diagram illustrating an example of a processing result of step S2.

The description will now be given with reference back to FIG. 3. In step S2, the processor 41 extracts an area having a small size among the extracted areas. For example, the processor 41 extracts an area having an area size smaller than or equal to a threshold size (for example, a first area) among the extracted areas. FIG. 7 is a diagram illustrating an example of a processing result of step S2. The halftones illustrated in FIG. 7 indicate the distance to each range point in the small-size area.

In FIG. 3, in step S3, the processor 41 extracts an area group formed by grouping small areas, each of which has a close distance in terms of two-dimensional coordinates in the input area, and which have greatly different distance values. The small areas, each of which has a close distance in terms of two-dimensional coordinates, may be, for example, a small area having a distance from a target area in the input image, the distance being less than or equal to a threshold (for example, a third threshold). The small areas having greatly different distance values may each be, for example, a small area having a distance value different to the distance value of a target area, the difference being greater than a threshold (for example, a fourth threshold). For example, the first threshold for use in step S1 and the third threshold for use in step S3 may be the same or may be different.

Figure 8:
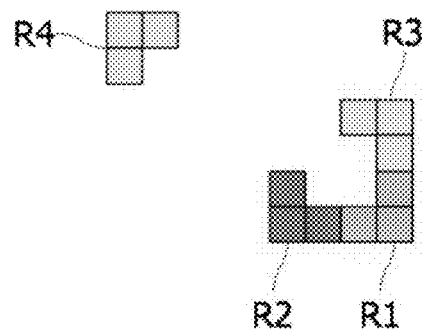
FIG. 8 is a diagram illustrating grouping.

FIG. 8 is a diagram illustrating grouping. In FIG. 8, when a small area R1 indicated by hatching is a target area, a small area R2 has a small area size, has a short distance to the target area R1 in terms of two-dimensional coordinates, and has a distance value that is greatly different from the distance value of the target area R1, in this example. Therefore, the small area R2 and the target area R1 are grouped together to form an area group (R1, R2). In contrast, a small area R3 has a small area size and has a short distance to the target area R1 in terms of two-dimensional coordinates, but has a distance value close to the distance value of the target area R1, in this example. Therefore, the small area R3 and the target area R1 are not grouped together. In addition, a small area R4 has a small area size but has a long distance to the target area R1 in terms of two-dimensional coordinates in this example, and therefore even when the small area R4 has a distance value that is greatly different from the distance value of the target area R1, the small area R4 and the target area R1 are not grouped together.

Figure 9:
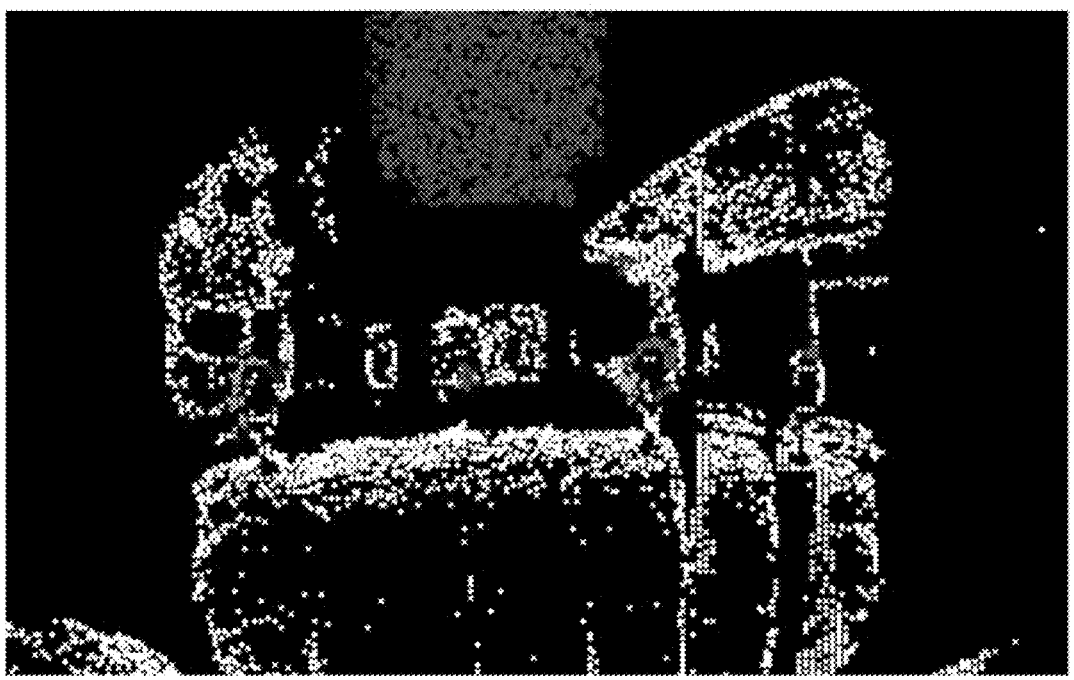
FIG. 9 is a diagram illustrating an example of a processing result in step S3.

FIG. 9 is a diagram illustrating an example of a processing result of step S3. The halftones illustrated in FIG. 9 are given for identifying an area group formed by grouping small areas, each of which has a short distance in terms of two-dimensional coordinates in the input image, and which have greatly different distance values, and do not indicate the distance value of each small area. In addition, in FIG. 9, the areas of range points that are not grouped are indicated in white for the sake of convenience.

Figure 10:
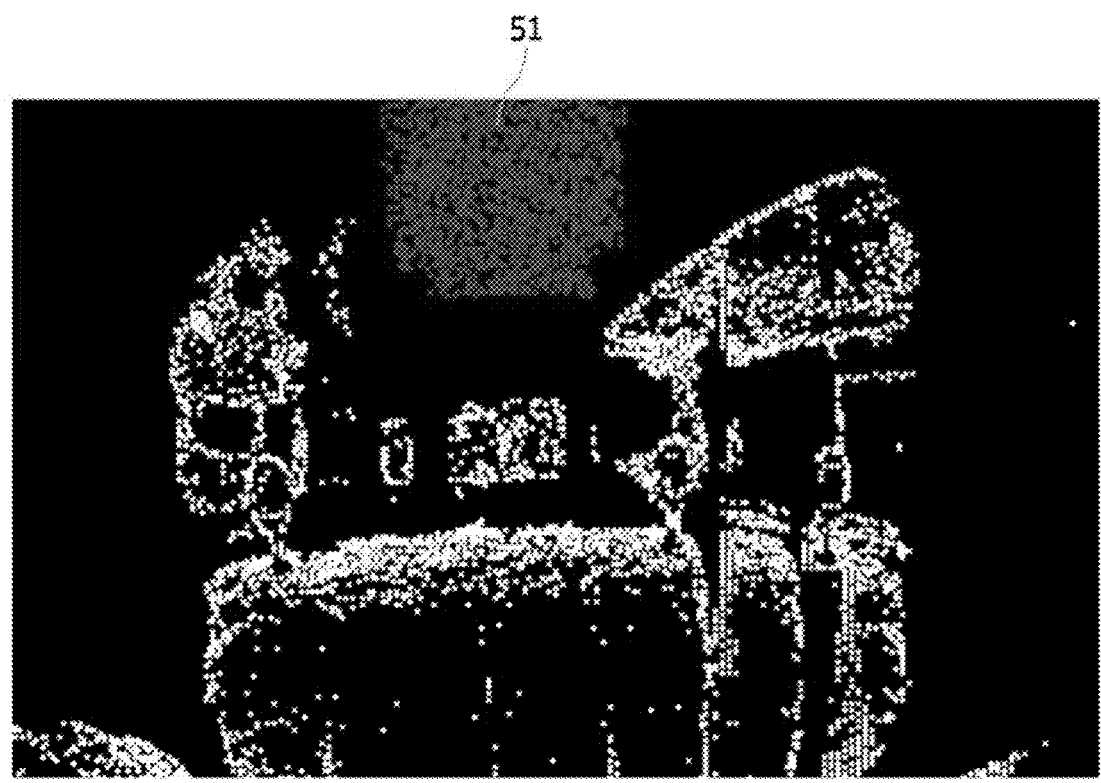
FIG. 10 is a diagram illustrating an example of a processing result in step S4.

The description will now be given with reference back to FIG. 3. In step S4, the processor 41 determines, among extracted area groups, an area group where the number of areas (the number of small areas) forming the area group is greater than or equal to a certain number, as a noise area. FIG. 10 is a diagram illustrating an example of a processing result of step S4. The halftones illustrated in FIG. 10 are given for identifying, among the extracted area groups, an area group where the number of areas forming the area group is greater than or equal to a certain number, and do not indicate the distance value of each area group. In the example illustrated in FIG. 10, an area group 51 is determined as a noise area. In this way, an area where the distance is not correctly measured because of the influence of sunlight (noise area) may be determined. That is, noise resulting from the influence of sunlight in the input image may be detected.

Figure 11:
FIG. 11 is a diagram illustrating an example of a result of a noise removal process.

The area group 51 determined as a noise area in step S4 of the process illustrated in FIG. 3 may be subjected to a noise removal process in which the area group 51 is removed from the input image illustrated in FIG. 5. FIG. 11 is a diagram illustrating an example of a result of the noise removal process. FIG. 11, like FIG. 5, represents distance values by halftones. In this way, removing noise resulting from the influence of sunlight in the input image enables distances to be accurately measured.

Figure 12:
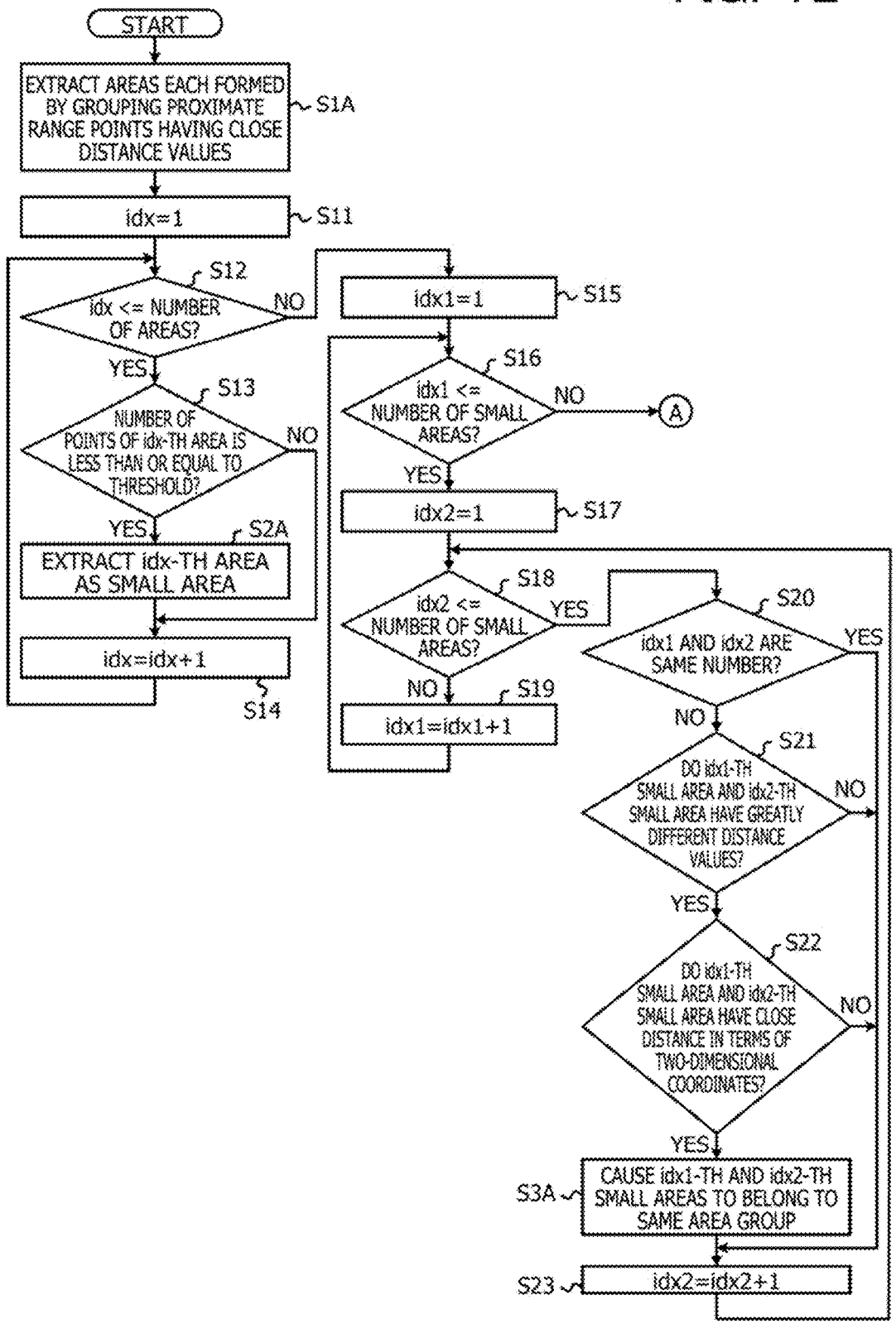
FIG. 12 is a flowchart more particularly illustrating an example of the distance measurement process in the first embodiment.
Figure 13:
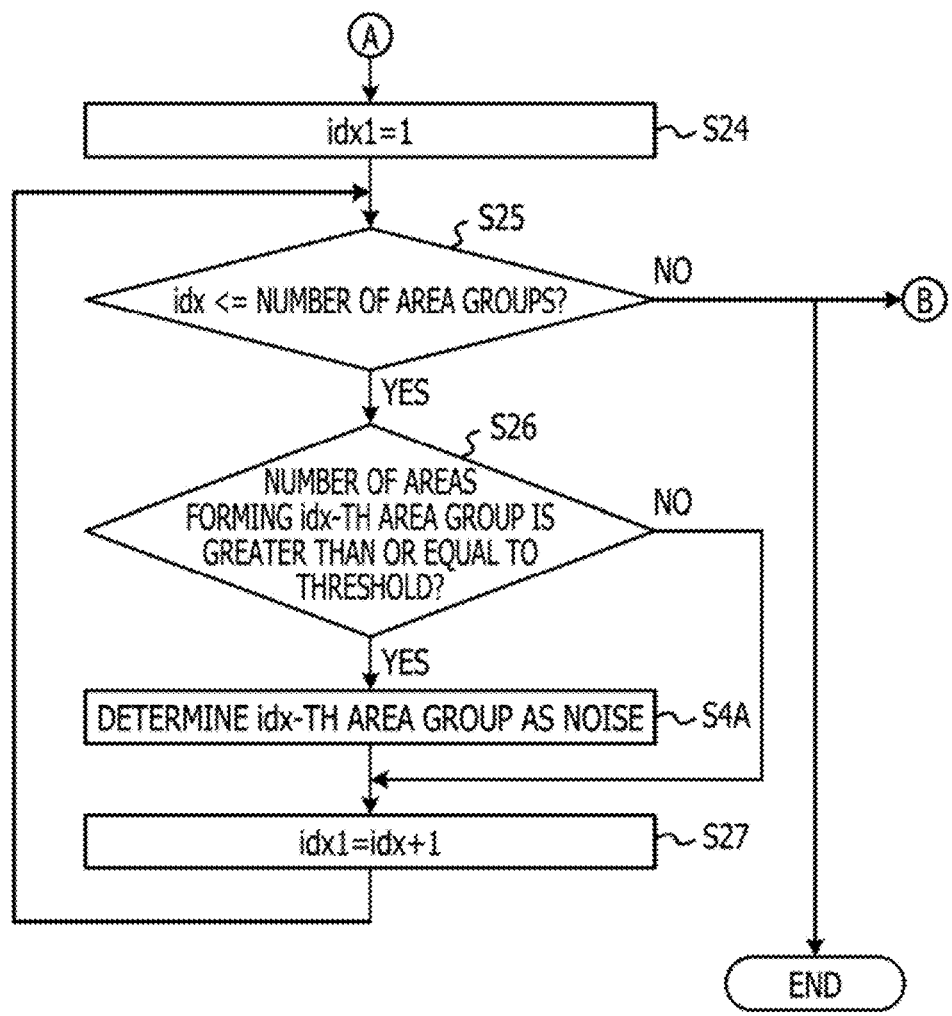
FIG. 13 is a flowchart more particularly illustrating an example of the distance measurement process in the first embodiment.

FIG. 12 and FIG. 13 are flowcharts more particularly illustrating the distance measurement process in the first embodiment. The distance measurement process illustrated in FIG. 12 and FIG. 13 is executed, for example, by the processor 41 illustrated in FIG. 2. In FIG. 12, in step S1A, the processor 41 extracts areas each formed by grouping proximate range points having close distance values in the input image illustrated in FIG. 5. In this input image, the distance to each range point is represented, for example, by pixel color in accordance with the distance value. Through the process in step S1A, a processing result of step S1 in FIG. 3 is obtained. In step S11, the processor 41 sets idx, which denotes the number of an area, so that idx=1, and, in step S12, the processor 41 determines whether or not idx is less than or equal to the number of areas. If the determination result of step S12 is Yes, the process proceeds to step S13; if the determination result is No, the process proceeds to step S15 described below.

In step S13, the processor 41 determines whether or not the number of range points of the idx-th area is less than or equal to a threshold. If the determination result is Yes, the process proceeds to step S2A; if the determination result is No, the process proceeds to step S14. In step S2A, the processor 41 extracts an area having an area size smaller than or equal to a threshold size among the extracted areas. Through the process in step S2A, a processing result of step S2 illustrated in FIG. 3 is obtained. In step S14, the processor 41 increments idx so that idx=idx+1, and the process returns to step S12.

In step S15, the processor 41 sets idx1 so that idx1=1, and, in step S16, the processor 41 determines whether or not idx1 is less than or equal to the number of small areas. If the determination result of step S16 is Yes, the process proceeds to step S17; if the determination result is No, the process proceeds to step S24 described below in conjunction with FIG. 13. In step S17, the processor 41 sets idx2 so that idx2=1, and, in step S18, the processor 41 determines whether or not idx2 is less than or equal to the number of small areas. If the determination result of step S18 is No, the process proceeds to step S19; if the determination result is Yes, the process proceeds to step S20. In step S19, the processor 41 increments idx1 so that idx1=idx1+1, and the process returns to step S16.

In step S20, the processor 41 determines whether or not idx1 and idx2 denote the same number. If the determination result is No, the process proceeds to step S21; if the determination result is Yes, the process proceeds to step S23 described below. In step S21, the processor 41 determines whether or not the idx1-th small area and the idx2-th small area have greatly different distance values such that the difference between the distance values is greater than a threshold. If the determination result is Yes, the process proceeds to step S22; if the determination result is No, the process proceeds to step S23. In step S22, the processor 41 determines whether or not the idx1-th small area and the idx2-th small area have a close distance in terms of two-dimensional coordinates such that the distance is less than or equal to a threshold. If the determination result is Yes, the process proceeds to step S3A; if the determination result is No, the process proceeds to step S23.

In step S3A, the processor 41 groups the idx1-th and idx2-th small areas having a close distance in terms of two-dimensional coordinates in the input image and having greatly different distance values, thereby causing the idx1-th and idx2-th small areas to belong to the same area group. Through the process in step S3A, the processing result of step S3 in FIG. 3 is obtained. In step S23, the processor 41 increments idx2 so that idx2=idx2+1, and the process returns to step S18.

In FIG. 13, in step S24, the processor 41 sets idx so that idx=1, and, in step S25, the processor 41 determines whether or not idx is smaller than or equal to the number of area groups. If the determination result of step S25 is Yes, the process proceeds to step S26; if the determination result is No, the process is completed. Note that if the determination result of step S25 is No, the process may proceed to step S31 described below in conjunction with FIG. 29.

In step S26, the processor 41 determines whether or not the number of areas forming the idx-th area group is greater than or equal to a threshold. If the determination result is Yes, the process proceeds to S4A; if the determination result is No, the process proceeds to step S27 described below. In step S4A, the processor 41 determines the idx-th area group among the extracted area groups, as a noise area. Through the process of step S4A, the processing result of step S4 in FIG. 3 is obtained. In step S27, the processor 41 increments idx so that idx=idx+1, and the process returns to step S25.

Figure 14:
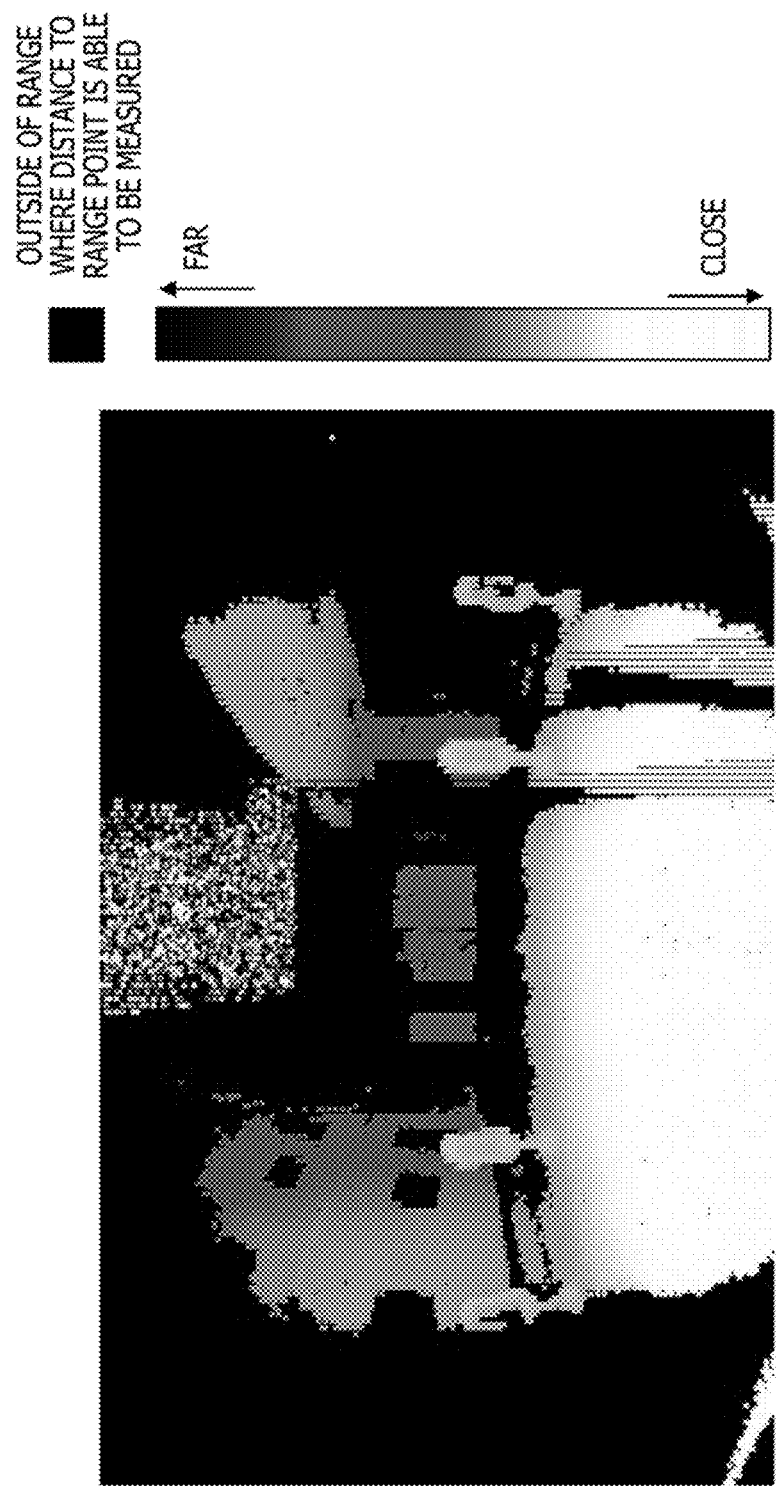
FIG. 14 is a diagram illustrating an example of an input image.
Figure 15:
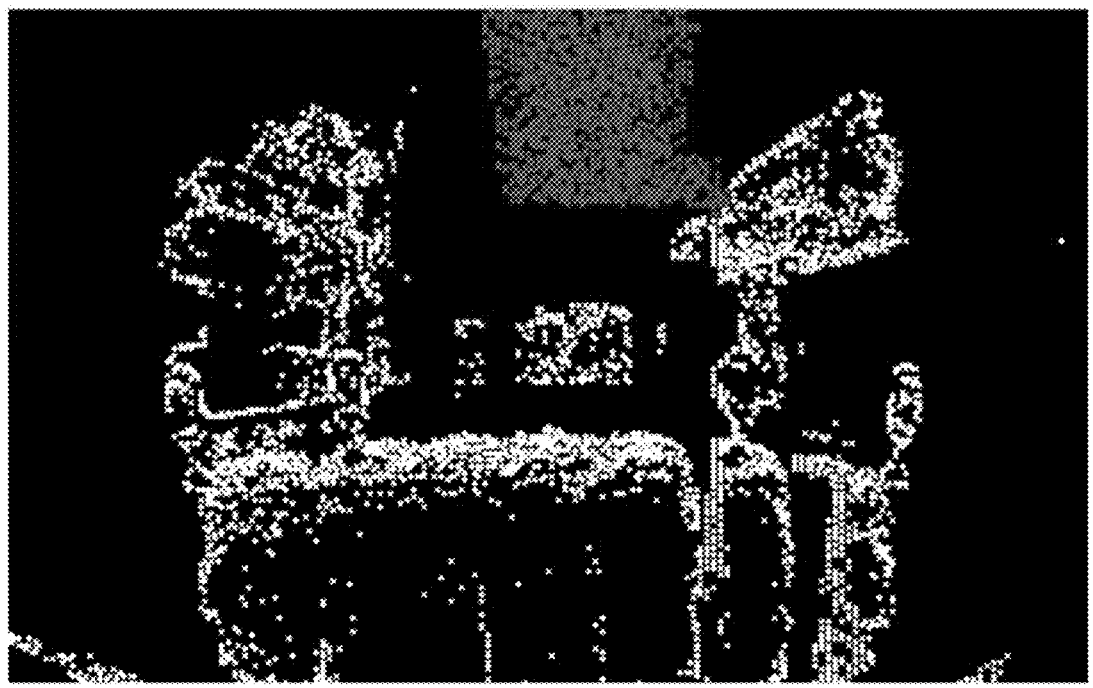
FIG. 15 is a diagram illustrating an example of a processing result of steps S1 to S4.
Figure 16:
FIG. 16 is a diagram illustrating an example of a result of a noise removal process.

When noise resulting from the influence of sunlight in the input image is in contact with a photographic subject, removing noise detected by the above distance measurement process of the first embodiment results in some cases in removing part of the photographic subject together with the noise. FIG. 14 to FIG. 16 are diagrams for explanation of a noise removal result in such a case. In particular, FIG. 14 is a diagram illustrating an example of an input image and, like FIG. 5, represents distance values by halftones. FIG. 15 is a diagram illustrating an example of a processing result of steps S1 to S4 for the input image illustrated in FIG. 14, and, as in FIG. 10, the halftones are given for identifying an area group in which the number of areas forming the area group is greater than or equal to a certain number. In addition, FIG. 16 is a diagram illustrating an example of a result of a noise removal process by which the noise area detected in step S4 is removed. FIG. 16, like FIG. 14, represents distance values by halftones. In the example illustrated in FIG. 16, part of a photographic subject within a circle r1 is removed by the noise removal process.

Second Embodiment

Figure 17:
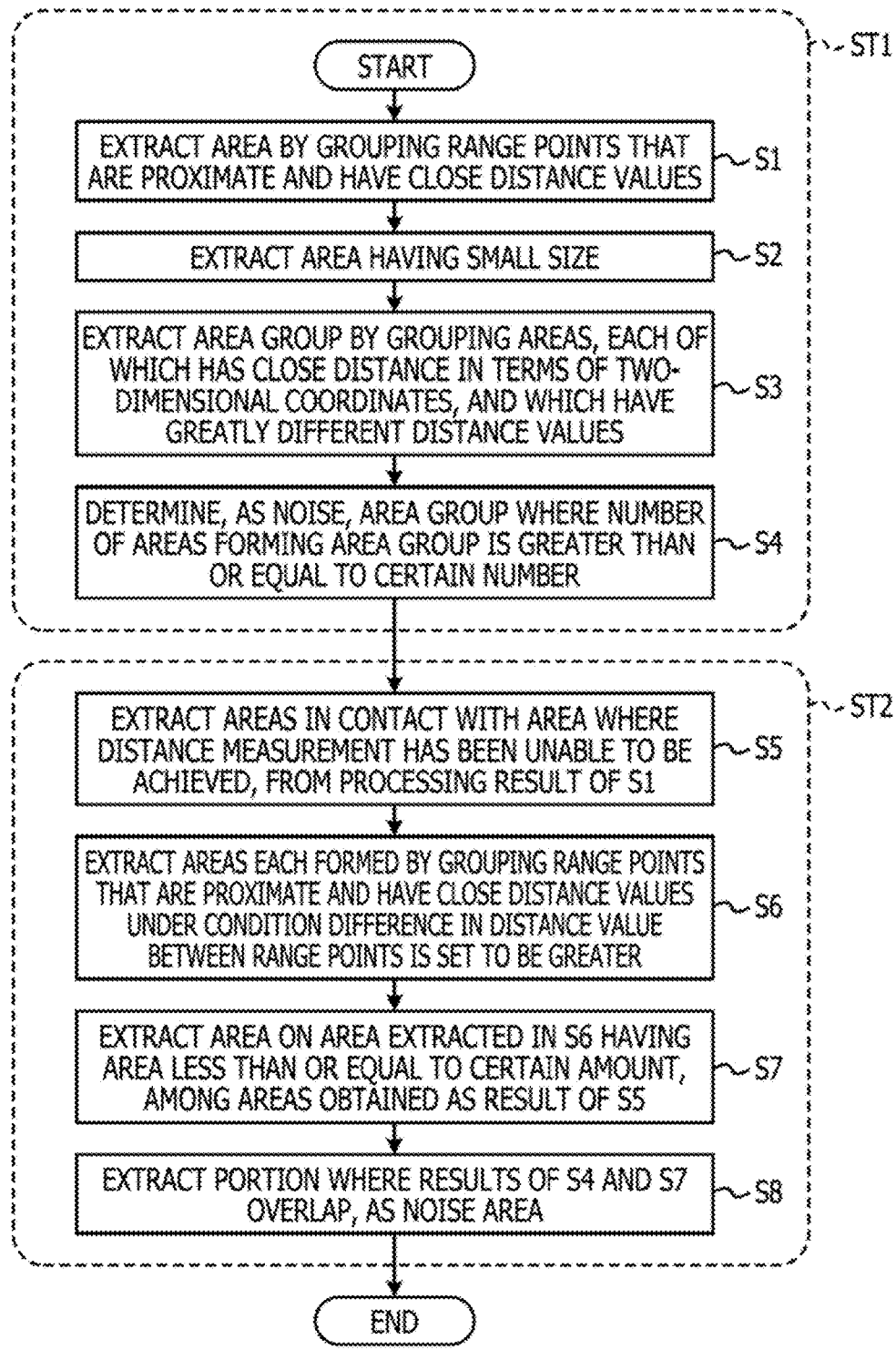
FIG. 17 is a flowchart illustrating an example of a distance measurement process in a second embodiment.

Next, a second embodiment will be described. In the second embodiment, part of a photographic subject in contact with a noise area in the input screen is inhibited from being removed together with the noise area. FIG. 17 is a flowchart illustrating an example of a distance measurement process in the second embodiment. In FIG. 17, the same steps as in FIG. 3 are denoted by the same reference numerals and description thereof is omitted. The distance measurement process illustrated in FIG. 17 is executed, for example, by the processor 41 illustrated in FIG. 2 executing a distance measurement program stored in the memory 42. In FIG. 17, steps S1 to S4 included in a procedure ST1 are the same as steps S1 to S4 illustrated in FIG. 3. In addition, FIG. 18 to FIG. 22 correspond to FIG. 5 to FIG. 7, FIG. 9, and FIG. 10.

Figure 18:
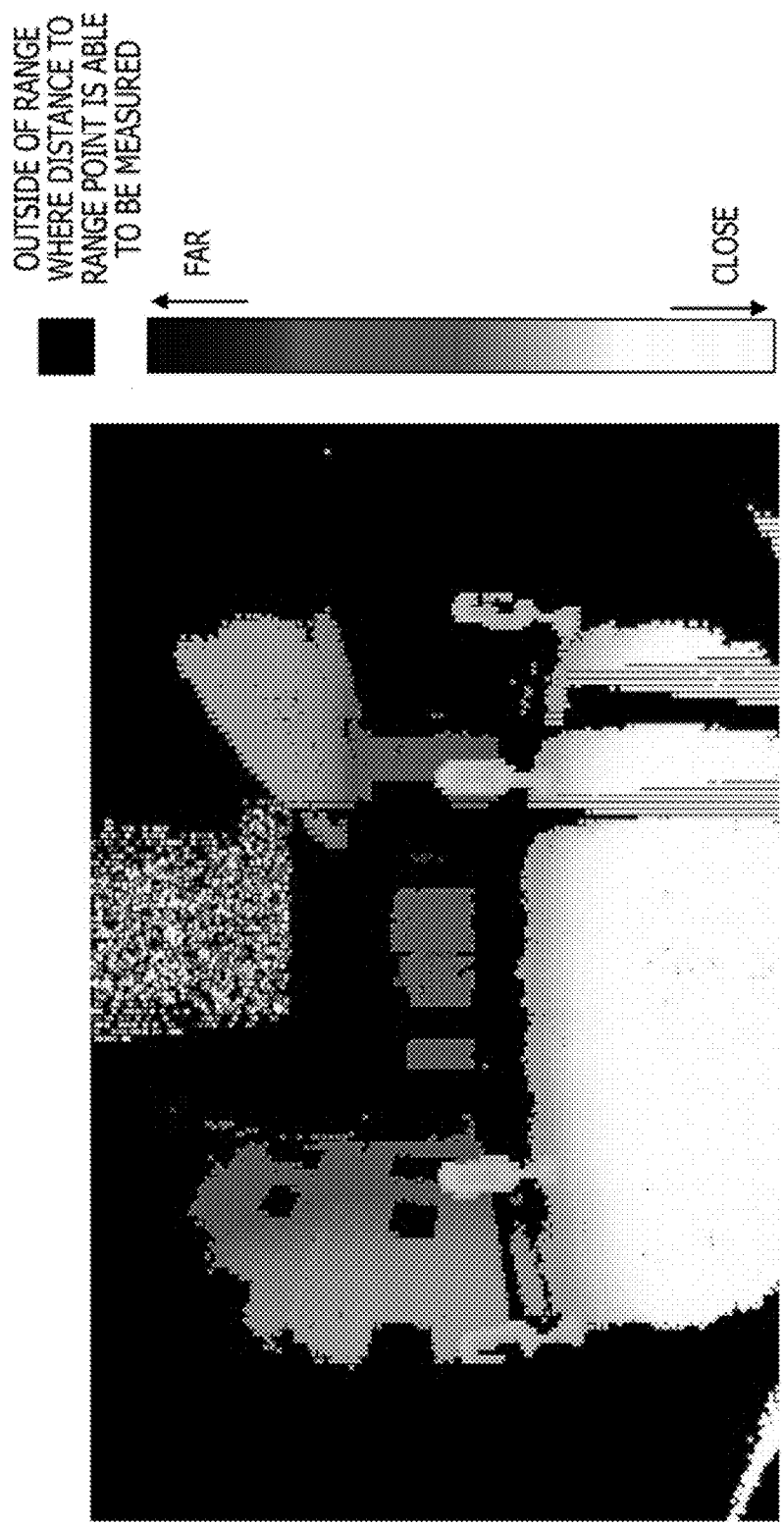
FIG. 18 is a diagram illustrating an example of an input image.
Figure 19:
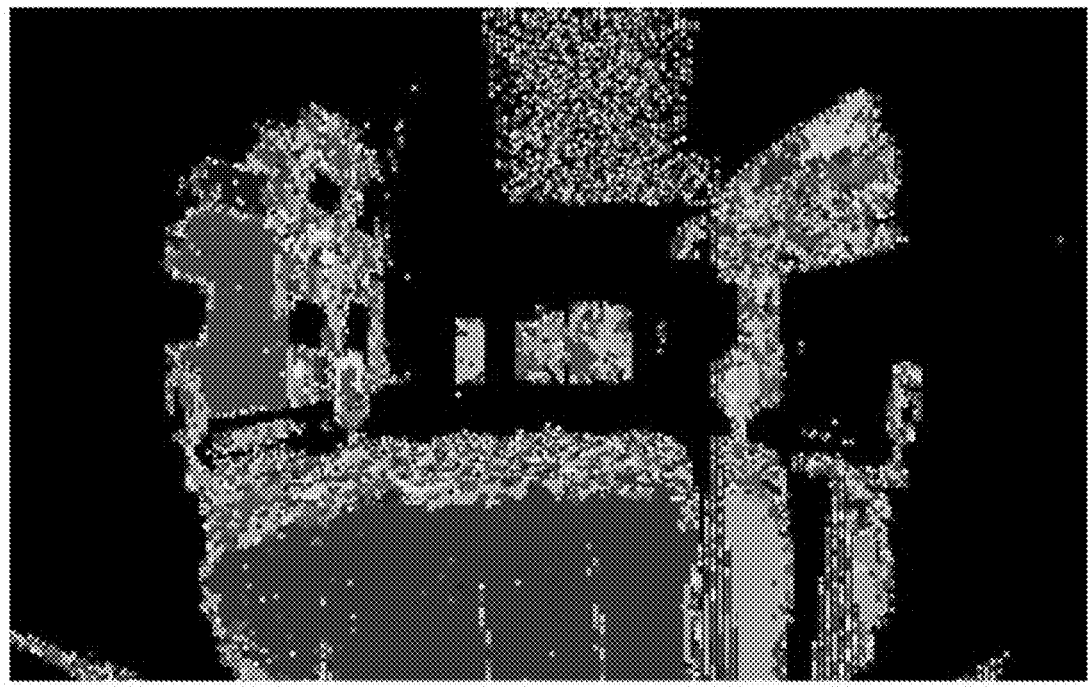
FIG. 19 is a diagram illustrating an example of a processing result of step S1.
Figure 20:
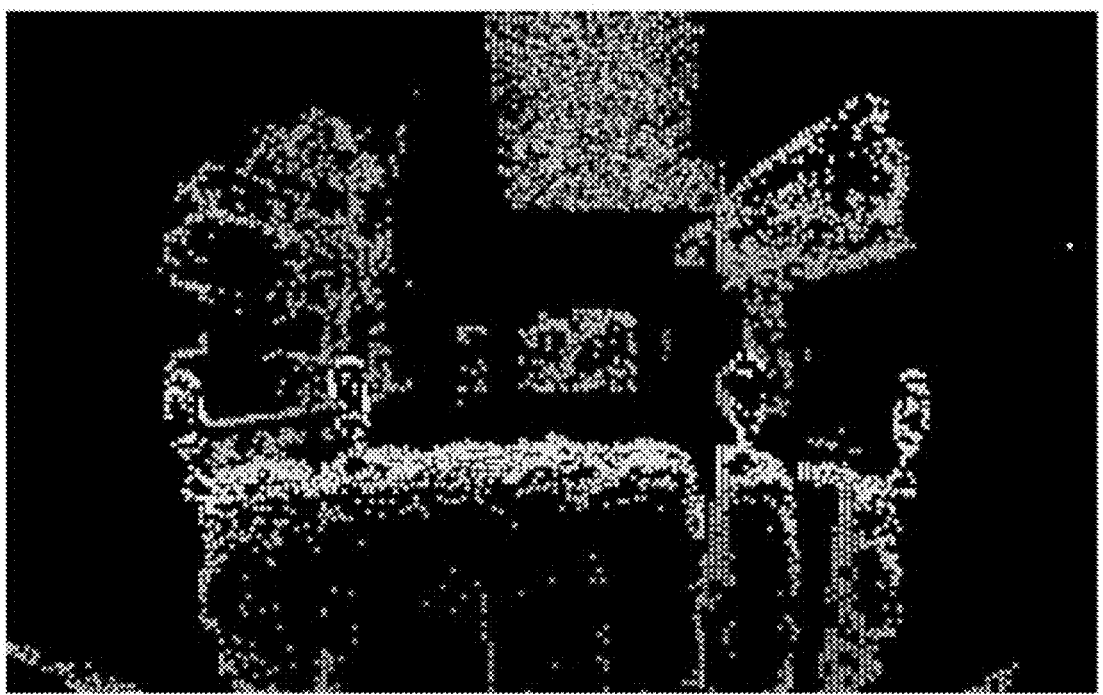
FIG. 20 is a diagram illustrating an example of a processing result of step S2.
Figure 21:
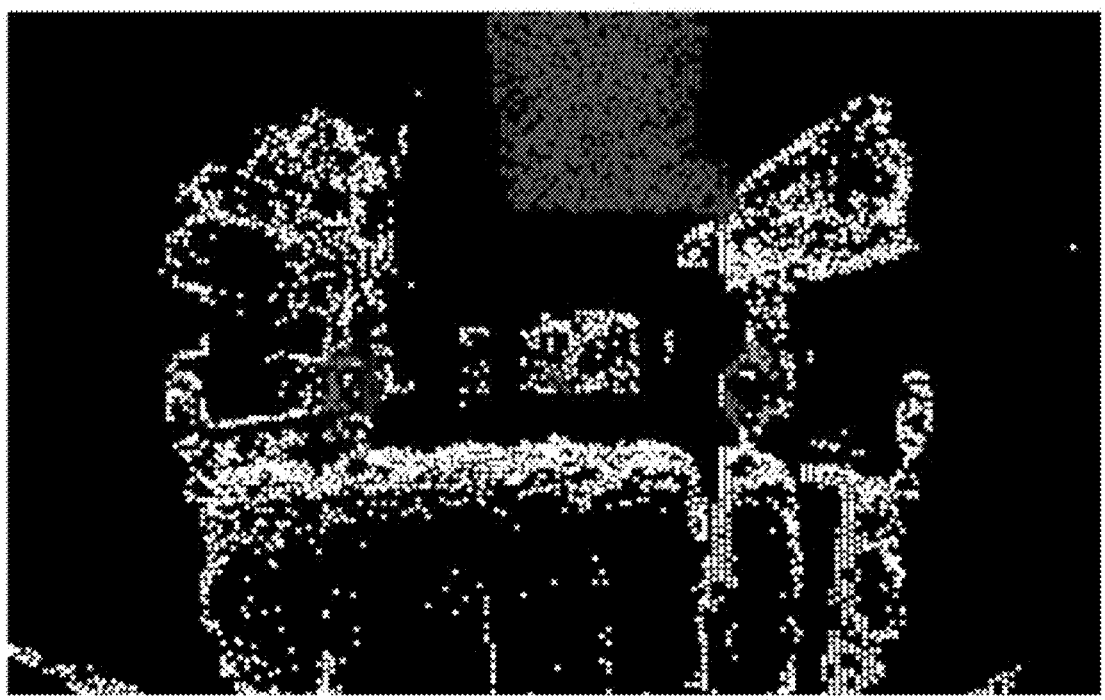
FIG. 21 is a diagram illustrating an example of a processing result of step S3.
Figure 22:
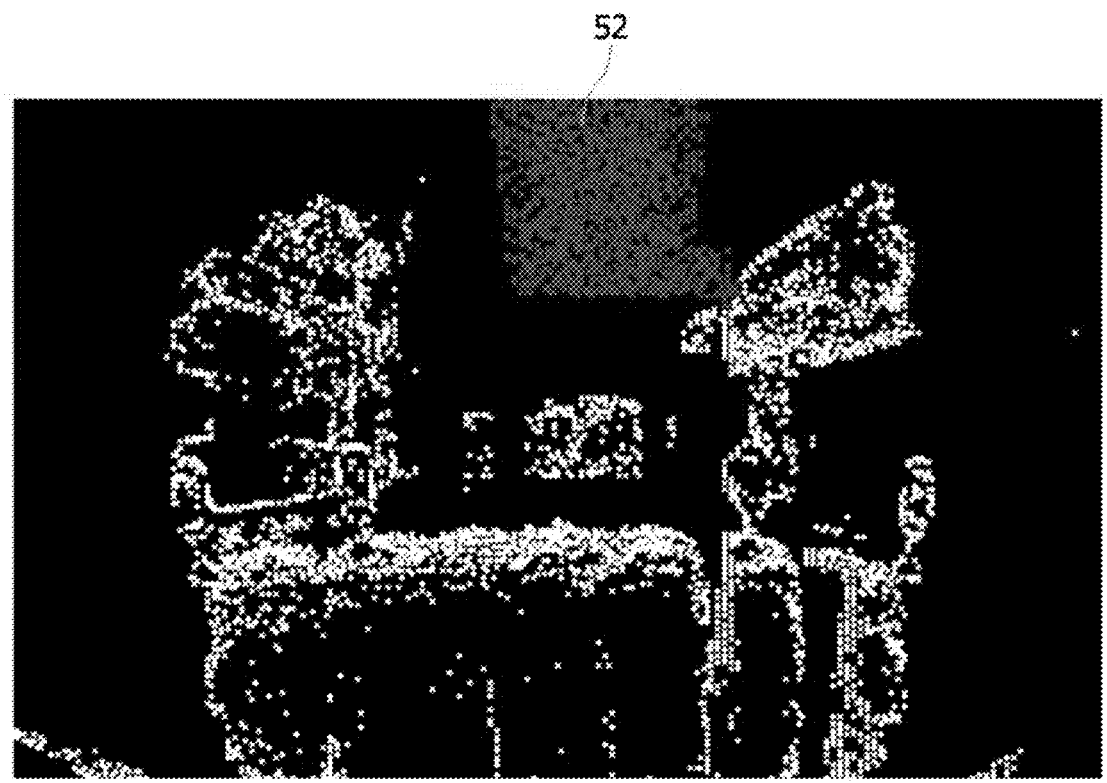
FIG. 22 is a diagram illustrating an example of a processing result of step S4.

FIG. 18 is a diagram illustrating an example of an input image. FIG. 19 is a diagram illustrating an example of a processing result of step S1 for the input image illustrated in FIG. 18. FIG. 20 is a diagram illustrating an example of a processing result of step S2 for the processing result illustrated in FIG. 19. FIG. 21 is a diagram illustrating an example of a processing result of step S3 for the input image illustrated in FIG. 20. FIG. 22 is a diagram illustrating an example of a processing result of step S4 for the input image illustrated in FIG. 21. In the example illustrated in FIG. 22, an area group 52 is determined as a noise area resulting from the influence of sunlight in the input image. As seen from FIG. 22, the noise area is in contact with a photographic subject at the upper right of the image.

Figure 23:
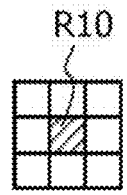
FIG. 23 is a diagram illustrating an area in contact with an area where it is not possible to achieve distance measurement.

A procedure ST2 includes steps S5 to S8 described below and is executed for the processing result of the procedure ST1. In step S5, the processor 41 extracts areas in contact with an area where the distance measurement has been unable to be achieved, from the processing result of step S1. FIG. 23 is a diagram illustrating areas in contact with an area where it is not possible to achieve distance measurement. In the example illustrated in FIG. 23, there are eight areas proximate to an area R10 indicated by hatching where the distance measurement has been unable to be achieved. In this example, if there are, among range points forming some one area where the distance measurement has been able to be achieved, one or more range points in contact with the area R10, where the distance measurement has been unable to be achieved, the one area is determined as an area in contact with the area where the distance measurement has been unable to be achieved (R10).

Figure 24:
FIG. 24 is a diagram illustrating an example of a processing result of step S5.

FIG. 24 is a diagram illustrating an example of a processing result of step S5. In FIG. 24, a range point for which the distance measurement has been unable to be achieved is indicated in black, a range point for which the distance measurement has been able to be achieved is indicated in gray, and an area in contact with the area extracted in step S5 where the distance measurement has been unable to be achieved is indicated in white.

In step S6, the processor 41 extracts areas (for example, second areas) each formed by grouping range points that are proximate and have close distance values in the input image illustrated in FIG. 18, in which the distance to each range point is represented, for example, by pixel color in accordance with the distance value, by a procedure similar to that in step S1. However, the range points having close distance values in step S6 refer to range points between which the difference in distance value is less than or equal to a threshold greater than the threshold used in step S1 (for example, the second threshold). Setting the threshold for use in determining range points having close distance values to be greater than the threshold for use in step S1 facilitates producing a small area that is not determined as noise and thus is left behind finally.

In this way, through the process in steps S5 and S6, among the first areas determined as noise areas, the second areas are extracted. The second area is formed of range points between which the difference in distance value is less than or equal to a threshold, the threshold being greater than the second threshold used in step S1.

Figure 25:
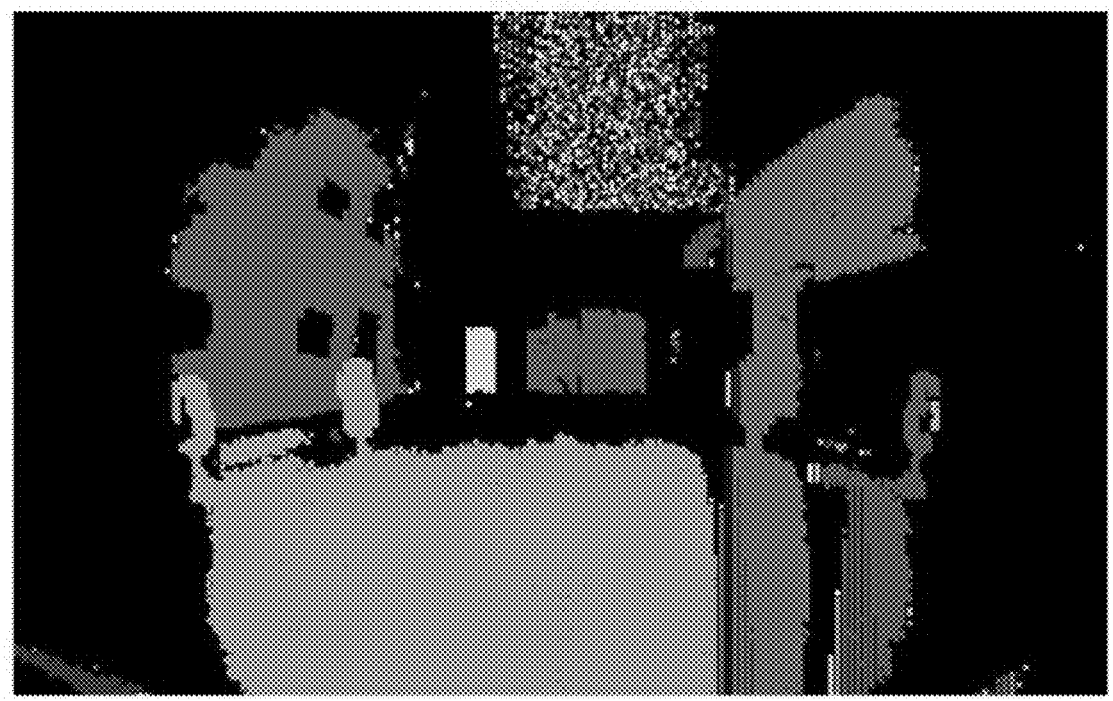
FIG. 25 is a diagram illustrating an example of a processing result of step S6.

FIG. 25 is a diagram illustrating an example of a processing result of step S6. Different density levels of halftones illustrated in FIG. 25 are given simply for identifying different areas, and do not indicate the distance value of each range point.

In step S7, the processor 41 extracts an area lying on the area extracted in step S6 having an area less than or equal to a certain amount, among the areas obtained as a processing result of step S5, the areas being in contact with the area where the distance measurement has been unable to be achieved.

Figure 26:
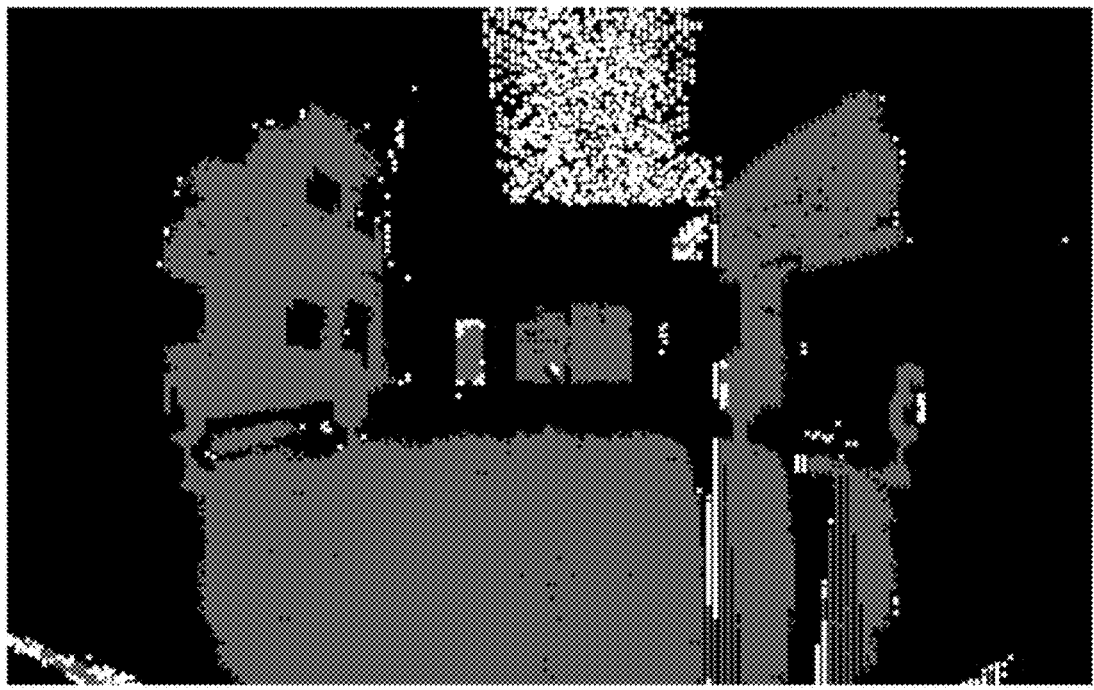
FIG. 26 is a diagram illustrating an example of a processing result of step S7.

FIG. 26 is a diagram illustrating an example of a processing result of step S7. In FIG. 26, a range point for which the distance measurement has been unable to be achieved is indicated in black, a range point for which the distance measurement has been able to be achieved is indicated in gray, and an area extracted through step S7 is indicated in white.

In step S8, the processor 41 determines a portion where the noise area extracted in step S4 and the area extracted in step S7 overlap, as a noise area, and extracts the portion as the noise area.

In this way, through the process in steps S7 and S8, a portion where, among the first areas determined as noise areas, the first area lying on the second area having an area less than or equal to a certain amount and being extracted through the process of steps S5 and S6 overlap the area group determined as noise areas in step S4 is determined as a noise area.

Figure 27:
FIG. 27 is a diagram illustrating an example of a processing result of step S8.

FIG. 27 is a diagram illustrating an example of a processing result of step S8. In FIG. 27, a range point for which the distance measurement has been unable to be achieved is indicated in black, a range point for which the distance measurement has been able to be achieved is indicated in gray, and a noise area extracted in step S8 is indicated in white.

Figure 28:
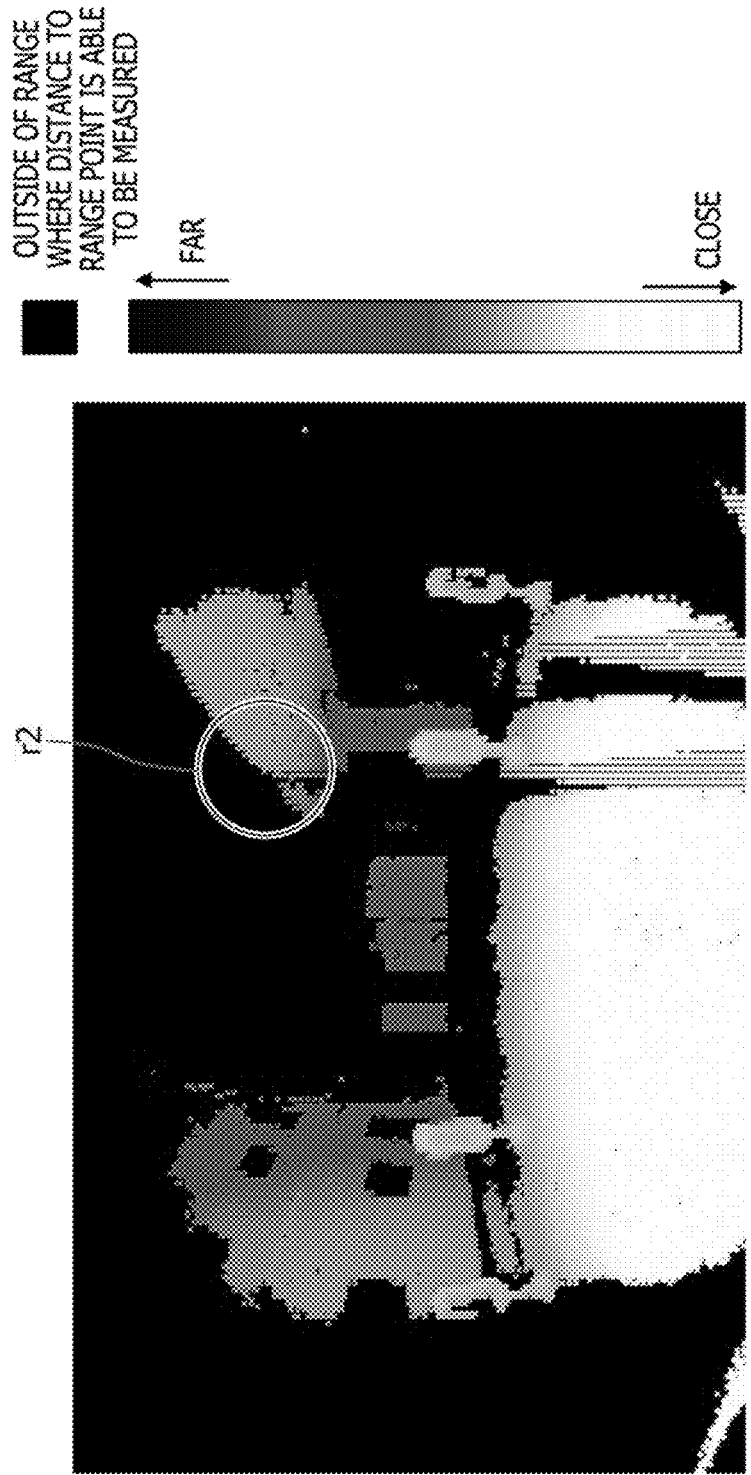
FIG. 28 is a diagram illustrating an example of a result of a noise removal process.

In the process illustrated in FIG. 17, a noise removal process by which the noise area extracted in step S8 is removed from the input image illustrated in FIG. 18 may be performed. FIG. 28 is a diagram illustrating an example of a result of a noise removal process. FIG. 28, like FIG. 18, represents distance values by halftones. In this way, removing noise areas (corresponding to the area group 52 illustrated in FIG. 22) resulting from the influence of sunlight in an input image enables distances to be accurately measured. In addition, in the example illustrated in FIG. 28, it is possible to inhibit part of a photographic subject in contact with a noise area, within the circle r2, from being removed by the noise removal process as in the example illustrated in FIG. 16.

Figure 29:
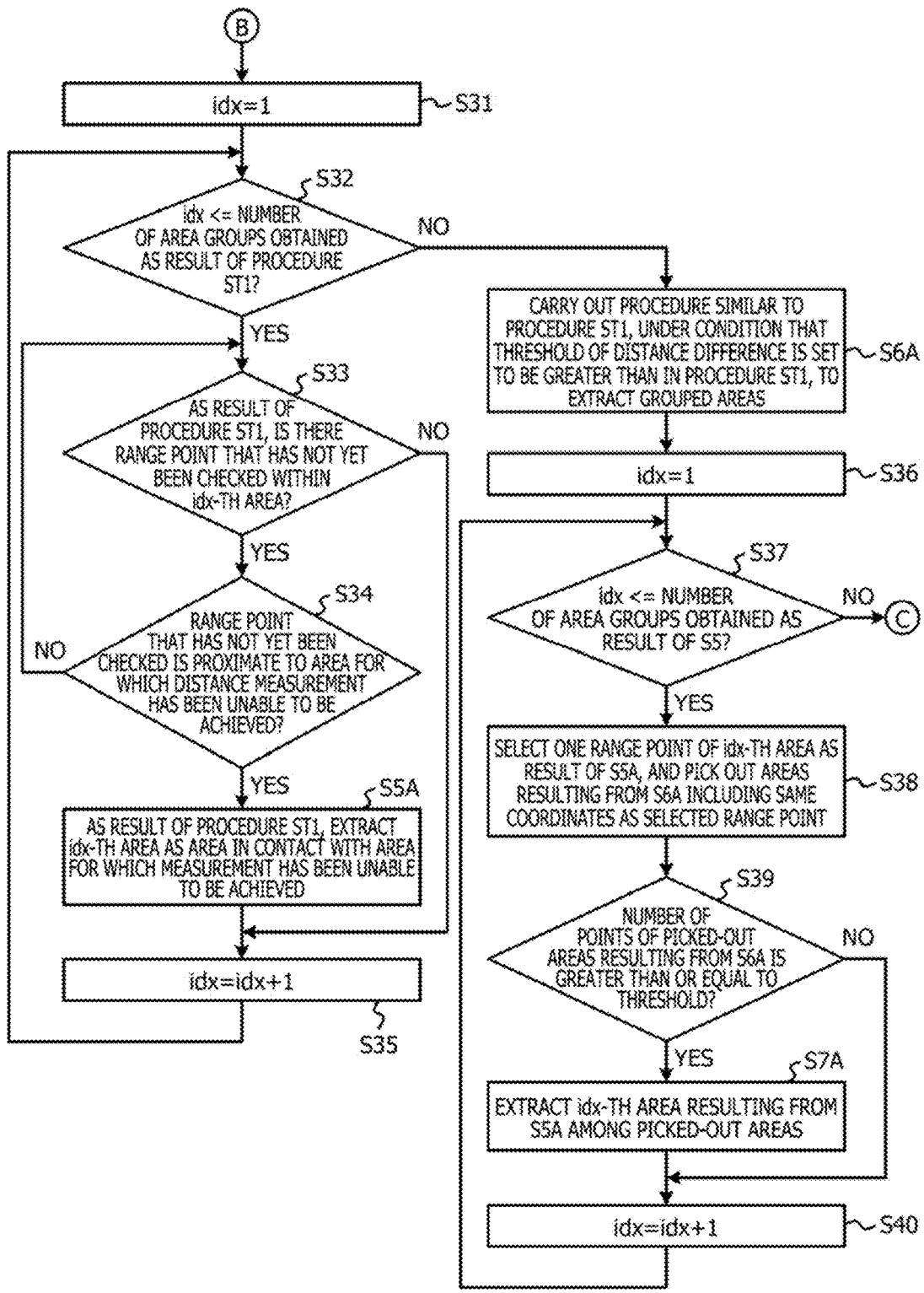
FIG. 29 is a flowchart more particularly illustrating an example of the distance measurement process in the second embodiment.
Figure 30:
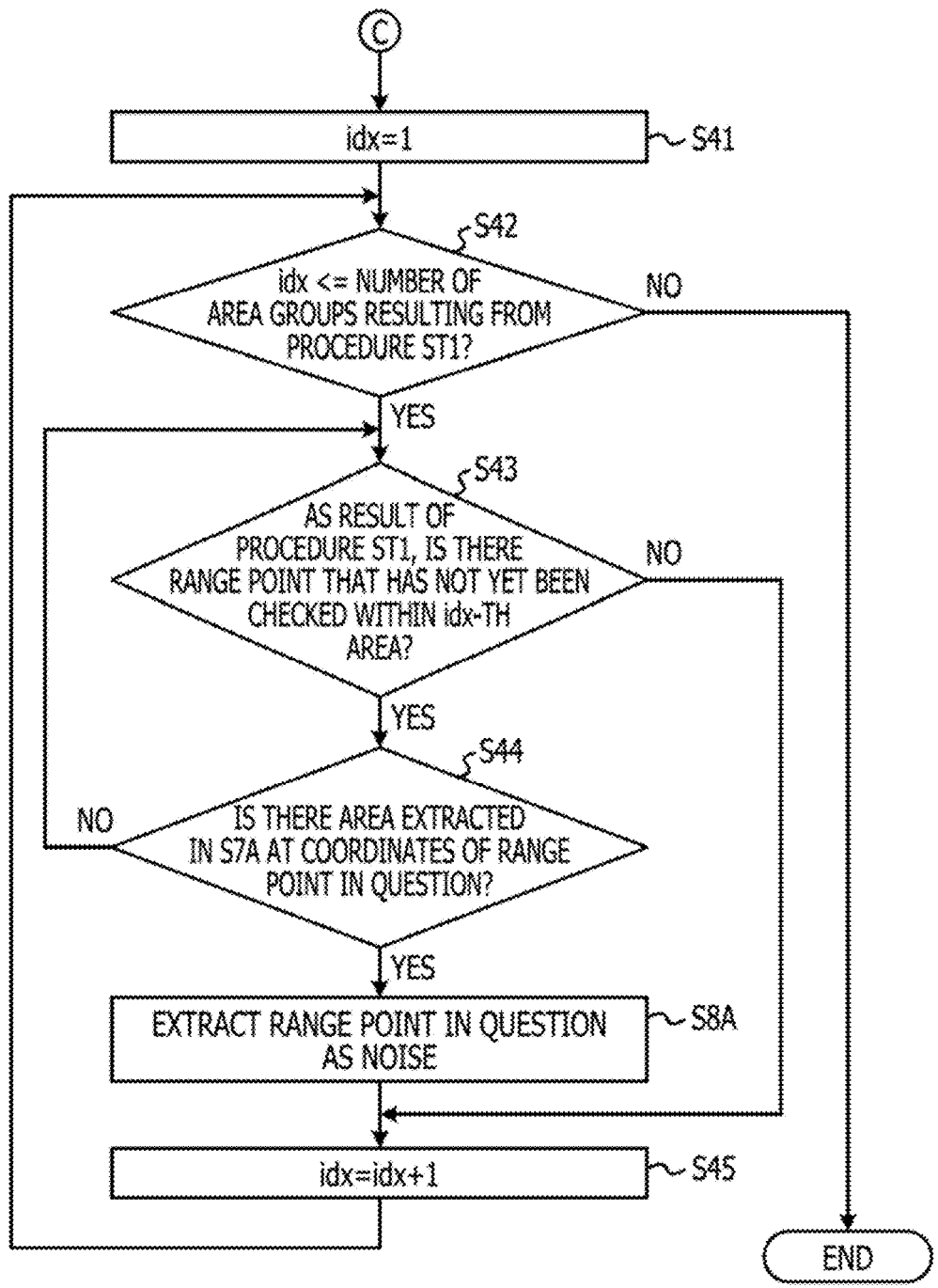
FIG. 30 is a flowchart more particularly illustrating the example of the distance measurement process in the second embodiment.

FIG. 29 and FIG. 30 are flowcharts more particularly illustrating an example of the distance measurement process in the second embodiment. The distance measurement process illustrated in FIG. 29 and FIG. 30 is executed, for example, by the processor 41 illustrated in FIG. 2. In FIG. 29, after the procedure ST1 illustrated in FIG. 17 (for example, when the determination result of step S25 illustrated in FIG. 13 is No), in step S31, the processor 41 sets idx indicating the number of an area so that idx=1, and, in step S32, the processor 41 determines whether or not idx is less than or equal to the number of area groups obtained as a result of the procedure ST1. If the determination result of step S32 is Yes, the process proceeds to step S33; if the determination result is No, the process proceeds to step S6A described below.

In step S33, the processor 41 determines whether or not, as a result of the procedure ST1, there is a range point that has not yet been checked within the idx-th area. If the determination result is Yes, the process proceeds to step S34; if the determination result is No, the process proceeds to step S35 described below. In step S34, the processor 41 determines whether or not the range point that has not yet been checked is proximate to an area for which the distance measurement has been unable to be achieved. If the determination result is No, the process returns to step S33; if the determination result is Yes, the process proceeds to step S5A. Whether or not the range point is proximate to the area for which distance measurement has been unable to be achieved may be determined based on whether or not there is a point for which distance measurement has been unable to be achieved among points proximate to the range point in question. In step S5A, as a result of the procedure ST1, the processor 41 extracts the idx-th area as an area in contact with an area for which measurement has been unable to be achieved. Through step S5A, the processing result of step S5 illustrated in FIG. 17 is obtained. In step S35, the processor 41 increments idx, which denotes the number of an area, so that idx=idx+1, and the process returns to step S32.

In step S6A, the processor 41 carries out a procedure similar to the procedure ST1, under the condition that the threshold of a distance difference is set to be greater than in the procedure ST1, to extract grouped areas. Through step S6A, the processing result of step S6 in FIG. 17 is obtained. In step S36, the processor 41 sets idx so that idx=1, and, in step S37, the processor 41 determines whether or not idx is less than or equal to the number of area groups resulting from step S5. If the determination result of step S37 is Yes, the process proceeds to step S38; if the determination result is No, the process proceeds to step S41 described below in conjunction with FIG. 30.

In step S38, the processor 41 selects one range point of the idx-th area as a result of step S5A, and picks out areas resulting from step S6A including the same coordinates as the selected range point. In step S39, the processor 41 determines whether or not the number of range points of the picked-out areas resulting from step S6A is less than or equal to a threshold. If the determination result is Yes, the process proceeds to step S7A; if the determination result is No, the process proceeds to step S40. In step S7A, the processor 41 extracts the idx-th area resulting from step S5A among the picked-out areas. Through step S7A, the processing result of step S7 of FIG. 17 is obtained. In step S40, the processor 41 increments idx so that idx=id+1, and the process returns to step S37.

In FIG. 30, in step S41, idx is set such that idx=1, and, in step S42, the processor 41 determines whether or not idx is less than or equal to the number of area groups resulting from the procedure ST1. If the determination result of step S42 is Yes, the process proceeds to step S43; if the determination result is No, the process is completed. In step S43, the processor 41 determines whether or not, as a result of the procedure ST1, there is a range point that has not yet been checked within the idx-th area. If the determination result is Yes, the process proceeds to step S44; if the determination result is No, the process proceeds to step S45 described below. In step S44, the processor 41 determines whether or not there is an area extracted in step S7A at the coordinates of the range point that has not yet been checked. If the determination result is No, the process returns to step S43; if the determination result is Yes, the process proceeds to step S8A. In step S8A, the processor 41 extracts the range point that has not yet been checked as noise. Through step S8A, the processing result of step S8 illustrated in FIG. 17 is obtained. In step S45, the processor 41 increments idx so that idx=idx+1, and the process returns to step S42.

When a measurement result of a distance measurement apparatus is output in the form of an image in which the distance to each range point is represented, such as when the result is represented in an image in which the distance is represented by pixel color in accordance with the distance value of each range point, a noise area that is not isolated results from the influence of sunlight in some cases. In other words, a noise area where distances are not accurately measured, that is, where range points having distance values that are irregular and are relatively greatly different are clustered together, results from the influence of sunlight in some cases in an image. However, according to the first and second embodiments described above, noise resulting from the influence of sunlight in an image in which the distance to each range point is represented may be detected. In addition, since noise in the image resulting from the influence of sunlight may be removed, the distances may be accurately measured.

Furthermore, according to the second embodiment described above, part of a photographic subject in contact with a noise area may be inhibited from being removed by the noise removal process.

Note that the order such as "first" and "second" attached to the embodiments is not intended to represent preferable priorities among the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for distance measurement, the apparatus comprising:
　a memory; and
　a processor coupled to the memory and configured to
　execute a measurement process that includes generating an image having a plurality of pixels, each of the plurality of pixels corresponding to a range point and representing a distance value obtained by measuring a distance to the range point based on reflected light of a pulsed laser beam for two-dimensional scanning,
　execute a first process that includes extracting, from the image, a first area having a plurality of range points at which the distance value is less than or equal to a first threshold, wherein a difference between each pair of the plurality of range points included in the first area is less than or equal to a second threshold, and the first area has an area size less than or equal to a threshold size, and
　execute a second process that includes
　　extracting an area group which has a plurality of the first areas, wherein a distance, in terms of two-dimensional coordinates in the image, between each of the plurality of the first areas and another of the plurality of the first areas is less than or equal to a third threshold, and a difference of the distance value between each pair of the plurality of the first areas is greater than a fourth threshold, and determining the area group as a noise area when the number of the plurality of the first areas included in the area group is greater than or equal to a certain number.

2. The apparatus according to claim 1,
wherein the first process includes
extracting the first area by grouping range points, each of which has a distance value on the image, the distance value being less than or equal to the first threshold, with the difference between the distance values of the range points being less than or equal to the second threshold, and extracting, among plural ones of the first area extracted, the first area the area size of which is less than or equal to the threshold size, and wherein the second process includes
extracting the area group formed by grouping the first areas, each of which has a distance in terms of the two-dimensional coordinates in the image, the distance being less than or equal to the third threshold, with the difference between the distance values being greater than the fourth threshold, and determining, as the noise area, an area group where the number of the first areas forming the area group is greater than or equal to a certain number.

3. The apparatus according to claim 1,
wherein the processor is configured to
execute a third process that includes extracting, among the first areas determined as the noise area, a second area of range points having a difference between the distance values, the difference being less than or equal to a threshold, the threshold being greater than the second threshold, and execute a fourth process that includes determining, as a noise area, among the first areas determined as the noise area, a portion where the first areas in the second area extracted in the third process, the second area having an area less than or equal to a certain amount, overlap the area group determined as the noise area in the second process.

4. The apparatus according to claim 1,
wherein the processor is configured to
execute a removal process that includes removing the area group determined as the noise area from the image.

5. The apparatus according to claim 1,
wherein one range point in terms of the two-dimensional coordinates in the image corresponds to one or a plurality of pixels of the image.

6. The apparatus according to claim 1,
wherein the processor is configured to execute a generation process that includes generating an image representing each range point by pixel color in accordance with a distance value.

7. The apparatus according to claim 1, the apparatus further comprising:
a light-transmitting circuit configured to transmit a pulsed infrared or near-infrared laser beam for two-dimensional scanning; and
a light-receiving circuit configured to detect reflected light of the laser beam and measures a distance to each range point.

8. A method, implemented by a processor circuitry, for distance measurement, the method comprising:
executing, by the processor circuitry, a measurement process that includes generating an image having a plurality of pixels, each of the plurality of pixels corresponding to a range point and representing a distance value obtained by measuring a distance to the range point based on reflected light of a pulsed laser beam for two-dimensional scanning;

executing, by the processor circuitry, a first process that includes extracting, from the image, a first area having a plurality of range points at which the distance value is less than or equal to a first threshold, wherein a difference between each pair of the plurality of range points included in the first area is less than or equal to a second threshold, and the first area has an area size less than or equal to a threshold size; and executing, by the processor circuitry, a second process that includes
extracting an area group which has a plurality of the first areas, wherein a distance, in terms of two-dimensional coordinates in the image, between each of the plurality of the first areas and another of the plurality of the first areas is less than or equal to a third threshold, and a difference of the distance value between each pair of the plurality of the first areas is greater than a fourth threshold, and determining the area group as a noise area when the number of the plurality of the first areas included in the area group is greater than or equal to a certain number.

9. The method according to claim 8,
wherein the first process includes
extracting the first area by grouping range points, each of which has a distance value on the image, the distance value being less than or equal to the first threshold, with the difference between the distance values of the range points being less than or equal to the second threshold, and extracting, among plural ones of the first area extracted, the first area the area size of which is less than or equal to the threshold size, and wherein the second process includes
extracting the area group formed by grouping the first areas, each of which has a distance in terms of the two-dimensional coordinates in the image, the distance being less than or equal to the third threshold, with the difference between the distance values being greater than the fourth threshold, and determining, as the noise area, an area group where the number of the first areas forming the area group is greater than or equal to a certain number.

10. The method according to claim 8, the method further comprising:
executing, by the processor circuitry, a third process that includes extracting, among the first areas determined as the noise area, a second area of range points having a difference between the distance values, the difference being less than or equal to a threshold, the threshold being greater than the second threshold, and executing, by the processor circuitry, a fourth process that includes determining, as a noise area, among the first areas determined as the noise area, a portion where the first areas in the second area extracted, the second area having an area less than or equal to a certain amount, overlap the area group determined as the noise area in the determining.

11. The method according to claim 8, the method further comprising:
executing, by the processor circuitry, a removal process that includes removing the area group determined as the noise area from the image.

12. The method according to claim 8,
wherein one range point in terms of the two-dimensional coordinates in the image corresponds to one or a plurality of pixels of the image.

13. The method according to claim 8, the method further comprising:
executing, by the processor circuitry, a generation process that includes generating an image representing each range point by pixel color in accordance with a distance value.

14. A non-transitory computer-readable storage medium storing a program that causes processor circuitry to execute a distance measurement process, the distance measurement process comprising:
executing a measurement process that includes generating an image having a plurality of pixels, each of the plurality of pixels corresponding to a range point and representing a distance value obtained by measuring a distance to the range point based on reflected light of a pulsed laser beam for two-dimensional scanning;
executing a first process that includes extracting, from the image, a first area having a plurality of range points at which the distance value is less than or equal to a first threshold, wherein a difference between each pair of the plurality of range points included in the first area is less than or equal to a second threshold, and the first area has an area size less than or equal to a threshold size; and
executing a second process that includes
extracting an area group which has a plurality of the first areas, wherein a distance, in terms of two-dimensional coordinates in the image, between each of the plurality of the first areas and another of the plurality of the first areas is less than or equal to a third threshold, and a difference of the distance value between each pair of the plurality of the first areas is greater than a fourth threshold, and
determining the area group as a noise area when the number of the plurality of the first areas included in the area group is greater than or equal to a certain number.

15. The storage medium according to claim 14,
wherein the first process includes
extracting the first area by grouping range points, each of which has a distance value on the image, the distance value being less than or equal to the first threshold, with the difference between the distance values of the range points being less than or equal to the second threshold, and
extracting, among plural ones of the first area extracted, the first area the area size of which is less than or equal to the threshold size, and
wherein the second process includes
extracting the area group formed by grouping the first areas, each of which has a distance in terms of the two-dimensional coordinates in the image, the distance being less than or equal to the third threshold, with the difference between the distance values being greater than the fourth threshold, and
determining, as the noise area, an area group where the number of the first areas forming the area group is greater than or equal to a certain number.

16. The storage medium according to claim 14,
wherein the distance measurement process includes
executing a third process that includes extracting, among the first areas determined as the noise area, a second area of range points having a difference between the distance values, the difference being less than or equal to a threshold, the threshold being greater than the second threshold, and
executing a fourth process that includes determining, as a noise area, among the first areas determined as the noise area, a portion where the first areas in the second area extracted, the second area having an area less than or equal to a certain amount, overlap the area group determined as the noise area in the determining.

17. The storage medium according to claim 14,
wherein the distance measurement process includes
executing a removal process that includes removing the area group determined as the noise area from the image.

18. The storage medium according to claim 14,
wherein one range point in terms of the two-dimensional coordinates in the image corresponds to one or a plurality of pixels of the image.

19. The storage medium according to claim 14,
wherein the distance measurement process includes
executing a generation process that includes generating an image representing each range point by pixel color in accordance with a distance value.

* * * * *